United States Patent
Contello et al.

(10) Patent No.: US 11,667,351 B2
(45) Date of Patent: Jun. 6, 2023

(54) SYSTEMS AND METHODS FOR AUTOMATIC CONFIGURATION AND AUTOMATIC CALIBRATION OF CONTINUOUSLY VARIABLE TRANSMISSIONS AND BICYCLES HAVING CONTINUOUSLY VARIABLE TRANSMISSION

(71) Applicant: Fallbrook Intellectual Property Company LLC, Leander, TX (US)

(72) Inventors: Wayne Leroy Contello, Austin, TX (US); Brian Benjamin Sweet, Leander, TX (US); Richard Hilgart, Bad Nauheim (DE); Jeffrey A. Birchak, San Diego, CA (US); Kevin Alan Gust, Austin, TX (US)

(73) Assignee: Fallbrook Intellectual Property Company LLC, Leander, TX (US)

( * ) Notice: Subject to any disclaimer, the term of this patent is extended or adjusted under 35 U.S.C. 154(b) by 10 days.

(21) Appl. No.: 17/129,564

(22) Filed: Dec. 21, 2020

(65) Prior Publication Data

US 2021/0206454 A1 Jul. 8, 2021

Related U.S. Application Data

(60) Division of application No. 16/034,659, filed on Jul. 13, 2018, now Pat. No. 10,875,603, which is a
(Continued)

(51) Int. Cl.
*F16H 61/66* (2006.01)
*B62M 25/08* (2006.01)
(Continued)

(52) U.S. Cl.
CPC .............. *B62M 25/08* (2013.01); *B62M 6/45* (2013.01); *B62M 9/04* (2013.01); *B62M 9/06* (2013.01);
(Continued)

(58) Field of Classification Search
CPC ........ F16H 61/66; F16H 61/664; B60L 15/20; B60L 58/12
See application file for complete search history.

(56) References Cited

U.S. PATENT DOCUMENTS 225,933 A 3/1880 Kellogg
719,595 A 2/1903 Huss
(Continued)

FOREIGN PATENT DOCUMENTS

CH 118064 12/1926
CN 1047556 12/1990
(Continued)

OTHER PUBLICATIONS

Examination Report dated Dec. 17, 2020 in Indian Patent Application No. 201837029026, 7 pages (LINEARB.106IN).
(Continued)

*Primary Examiner* — Tan Q Nguyen
(74) *Attorney, Agent, or Firm* — Sheppard, Mullin, Richter & Hampton LLP

(57) ABSTRACT

A continuously variable transmission on a bicycle may be automatically configured with little or no assistance from a user. Optical scanning devices, RFIDs, and other information capturing technology can communicate with a controller. The controller may then perform a portion or all of a configuration process. In operation, a controller may determine that calibration is needed. A calibration process may be
(Continued)

initiated and performed with little or no user interaction. A calibration process may account for a load, a power source, or an environment.

4 Claims, 6 Drawing Sheets

Related U.S. Application Data continuation of application No. 15/172,031, filed on Jun. 2, 2016, now Pat. No. 10,023,266.

(60) Provisional application No. 62/344,325, filed on Jun. 1, 2016, provisional application No. 62/334,947, filed on May 11, 2016.

(51) Int. Cl.
  *B62M 6/45* (2010.01)
  *B62M 9/04* (2006.01)
  *B62M 9/06* (2006.01)
  *B62M 9/10* (2006.01)
  *F16H 61/664* (2006.01)
  *F16H 15/28* (2006.01)
  *H04L 67/12* (2022.01)

(52) U.S. Cl.
  CPC ............... *B62M 9/10* (2013.01); *F16H 61/66* (2013.01); *F16H 15/28* (2013.01); *F16H 61/664* (2013.01); *H04L 67/12* (2013.01)

(56) References Cited

U.S. PATENT DOCUMENTS

| | | |
|---|---|---|
| 721,663 A | 3/1903 | Brooke |
| 1,121,210 A | 12/1914 | Teckel |
| 1,175,677 A | 3/1916 | Barnes |
| 1,207,985 A | 12/1916 | Null |
| 1,380,006 A | 5/1921 | Nielsen |
| 1,390,971 A | 9/1921 | Samain |
| 1,558,222 A | 10/1925 | Beetow |
| 1,629,092 A | 5/1927 | Crockett |
| 1,629,902 A | 5/1927 | Arter |
| 1,686,446 A | 10/1928 | Gilman |
| 1,774,254 A | 8/1930 | Daukus |
| 1,793,571 A | 2/1931 | Vaughn |
| 1,847,027 A | 2/1932 | Thomsen |
| 1,850,189 A | 3/1932 | Weiss |
| 1,858,696 A | 5/1932 | Weiss |
| 1,865,102 A | 6/1932 | Hayes |
| 1,903,228 A | 3/1933 | Thomson |
| 1,947,044 A | 2/1934 | Gove |
| 1,978,439 A | 10/1934 | Sharpe |
| 2,030,203 A | 2/1936 | Gove |
| 2,060,884 A | 11/1936 | Madle |
| 2,086,491 A | 7/1937 | Dodge |
| 2,097,631 A | 11/1937 | Madle |
| 2,100,629 A | 11/1937 | Chilton |
| 2,109,845 A | 3/1938 | Madle |
| 2,112,763 A | 3/1938 | Cloudsley |
| 2,123,008 A | 7/1938 | Hayes |
| 2,131,158 A | 9/1938 | Almen |
| 2,134,225 A | 10/1938 | Ejnar |
| 2,152,796 A | 4/1939 | Erban |
| 2,196,064 A | 4/1940 | Erban |
| 2,209,254 A | 7/1940 | Ahnger |
| 2,259,933 A | 10/1941 | Holloway |
| 2,269,434 A | 1/1942 | Brooks |
| 2,314,833 A | 3/1943 | Keese |
| 2,325,502 A | 7/1943 | Georges |
| RE22,761 E | 5/1946 | Wemp |
| 2,461,258 A | 2/1949 | Brooks |
| 2,469,653 A | 5/1949 | Kopp |
| 2,480,968 A | 9/1949 | Ronai |
| 2,553,465 A | 5/1951 | Barthelemy |
| 2,563,370 A | 8/1951 | Reese |
| 2,586,725 A | 2/1952 | Schottler |
| 2,595,367 A | 5/1952 | Picanol |
| 2,596,538 A | 5/1952 | Dicke |
| 2,597,849 A | 5/1952 | Alfredeen |
| 2,675,713 A | 4/1954 | Acker |
| 2,696,888 A | 12/1954 | Chillson |
| 2,716,357 A | 8/1955 | Rennerfelt |
| 2,730,904 A | 1/1956 | Rennerfelt |
| 2,748,614 A | 6/1956 | Weisel |
| 2,868,038 A | 1/1959 | Billeter |
| 2,873,911 A | 2/1959 | Perrine |
| 2,874,592 A | 2/1959 | Oehrli |
| 2,883,883 A | 4/1959 | Chillson |
| 2,891,213 A | 6/1959 | Kern |
| 2,901,924 A | 9/1959 | Banker |
| 2,913,932 A | 11/1959 | Oehrli |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | Forbes |
| 2,959,070 A | 11/1960 | Flinn |
| 2,959,972 A | 11/1960 | Madson |
| 2,964,959 A | 12/1960 | Beck |
| 2,982,154 A | 5/1961 | Zapletal |
| 3,008,061 A | 11/1961 | Mims |
| 3,028,778 A | 4/1962 | Hayward |
| 3,035,460 A | 5/1962 | Guichard |
| 3,048,056 A | 8/1962 | Wolfram |
| 3,051,020 A | 8/1962 | Hartupee |
| 3,081,641 A | 3/1963 | Iseman |
| 3,086,704 A | 4/1963 | Hurtt |
| 3,087,348 A | 4/1963 | Kraus |
| 3,088,704 A | 5/1963 | Grady |
| 3,154,957 A | 11/1964 | Kashihara |
| 3,163,050 A | 12/1964 | Kraus |
| 3,176,542 A | 4/1965 | Werner |
| 3,184,983 A | 5/1965 | Kraus |
| 3,204,476 A | 9/1965 | Rouverol |
| 3,207,248 A | 9/1965 | Strom |
| 3,209,606 A | 10/1965 | Sota |
| 3,211,364 A | 10/1965 | Wentling |
| 3,216,283 A | 11/1965 | General |
| 3,229,538 A | 1/1966 | Schottler |
| 3,237,468 A | 3/1966 | Schottler |
| 3,246,531 A | 4/1966 | Kashihara |
| 3,248,960 A | 5/1966 | Schottler |
| 3,273,468 A | 9/1966 | Allen |
| 3,277,745 A | 10/1966 | Harned |
| 3,280,646 A | 10/1966 | Lemieux |
| 3,283,614 A | 11/1966 | Hewko |
| 3,292,443 A | 12/1966 | Perruca |
| 3,340,895 A | 9/1967 | Osgood, Jr. |
| 3,407,687 A | 10/1968 | Hayashi |
| 3,413,896 A | 12/1968 | Wildhaber |
| 3,430,504 A | 3/1969 | Dickenbrock |
| 3,439,563 A | 4/1969 | Petty |
| 3,440,895 A | 4/1969 | Fellows |
| 3,464,281 A | 9/1969 | Hiroshi |
| 3,477,315 A | 11/1969 | Macks |
| 3,487,726 A | 1/1970 | Burnett |
| 3,487,727 A | 1/1970 | Gustafsson |
| 3,574,289 A | 4/1971 | Shelter |
| 3,581,587 A | 6/1971 | Dickenbrock |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz |
| 3,743,063 A | 7/1973 | Blechschmidt |
| 3,745,844 A | 7/1973 | Schottler |
| 3,768,715 A | 10/1973 | Tout |
| 3,769,849 A | 11/1973 | Hagen |
| 3,800,607 A | 4/1974 | Zurcher |
| 3,802,284 A | 4/1974 | Sharpe |
| 3,810,398 A | 5/1974 | Kraus |
| 3,820,416 A | 6/1974 | Kraus |

(56) References Cited

U.S. PATENT DOCUMENTS

| | | |
|---|---|---|
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,984,129 A | 10/1976 | Hege |
| 3,987,681 A | 10/1976 | Keithley |
| 3,996,807 A | 12/1976 | Adams |
| 4,023,442 A | 5/1977 | Woods |
| 4,098,146 A | 7/1978 | McLarty |
| 4,103,514 A | 8/1978 | Grosse-Entrup |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,314,485 A | 2/1982 | Adams |
| 4,345,486 A | 8/1982 | Olesen |
| 4,369,667 A | 1/1983 | Kemper |
| 4,382,186 A | 5/1983 | Denholm |
| 4,382,188 A | 5/1983 | Cronin |
| 4,391,156 A | 7/1983 | Tibbals, Jr. |
| 4,456,233 A | 6/1984 | Mueller |
| 4,459,873 A | 7/1984 | Black |
| 4,464,952 A | 8/1984 | Stubbs |
| 4,468,984 A | 9/1984 | Castelli |
| 4,494,524 A | 1/1985 | Wagner |
| 4,496,051 A | 1/1985 | Ortner |
| 4,501,172 A | 2/1985 | Kraus |
| 4,515,040 A | 5/1985 | Takeuchi |
| 4,526,255 A | 7/1985 | Hennessey |
| 4,546,673 A | 10/1985 | Shigematsu |
| 4,560,369 A | 12/1985 | Hattori |
| 4,567,781 A | 2/1986 | Russ |
| 4,569,670 A | 2/1986 | McIntosh |
| 4,574,649 A | 3/1986 | Seol |
| 4,585,429 A | 4/1986 | Marier |
| 4,592,247 A | 6/1986 | Mutschler |
| 4,617,838 A | 10/1986 | Anderson |
| 4,628,766 A | 12/1986 | De Brie Perry |
| 4,630,839 A | 12/1986 | Seol |
| 4,631,469 A | 12/1986 | Tsuboi |
| 4,643,048 A | 2/1987 | Hattori |
| 4,651,082 A | 3/1987 | Kaneyuki |
| 4,663,990 A | 5/1987 | Itoh |
| 4,667,525 A | 5/1987 | Schottler |
| 4,700,581 A | 10/1987 | Tibbals, Jr. |
| 4,706,518 A | 11/1987 | Moroto |
| 4,713,976 A | 12/1987 | Wilkes |
| 4,717,368 A | 1/1988 | Yamaguchi |
| 4,735,430 A | 4/1988 | Tomkinson |
| 4,738,164 A | 4/1988 | Kaneyuki |
| 4,744,261 A | 5/1988 | Jacobson |
| 4,756,211 A | 7/1988 | Fellows |
| 4,781,663 A | 11/1988 | Reswick |
| 4,828,422 A | 5/1989 | Anthony |
| 4,838,122 A | 6/1989 | Takamiya |
| 4,856,374 A | 8/1989 | Kreuzer |
| 4,857,035 A | 8/1989 | Anderson |
| 4,869,130 A | 9/1989 | Wiecko |
| 4,881,925 A | 11/1989 | Hattori |
| 4,884,473 A | 12/1989 | Lew |
| 4,900,046 A | 2/1990 | Aranceta-Angoitia |
| 4,909,101 A | 3/1990 | Terry, Sr. |
| 4,918,344 A | 4/1990 | Chikamori |
| 4,961,477 A | 10/1990 | Sweeney |
| 4,964,312 A | 10/1990 | Kraus |
| 4,976,170 A | 12/1990 | Hayashi |
| 5,006,093 A | 4/1991 | Itoh |
| 5,020,384 A | 6/1991 | Kraus |
| 5,025,685 A | 6/1991 | Kobayashi |
| 5,033,322 A | 7/1991 | Nakano |
| 5,033,571 A | 7/1991 | Morimoto |
| 5,037,361 A | 8/1991 | Takahashi |
| 5,044,214 A | 9/1991 | Barber, Jr. |
| 5,059,158 A | 10/1991 | Bellio |
| 5,069,655 A | 12/1991 | Schievelbusch |
| 5,083,982 A | 1/1992 | Sato |
| 5,099,710 A | 3/1992 | Nakano |
| 5,121,654 A | 6/1992 | Fasce |
| 5,125,677 A | 6/1992 | Ogilvie |
| 5,138,894 A | 8/1992 | Kraus |
| 5,156,412 A | 10/1992 | Meguerditchian |
| 5,166,879 A | 11/1992 | Greene |
| 5,194,052 A | 3/1993 | Ueda |
| 5,230,258 A | 7/1993 | Nakano |
| 5,236,211 A | 8/1993 | Meguerditchian |
| 5,236,403 A | 8/1993 | Schievelbusch |
| 5,261,858 A | 11/1993 | Browning |
| 5,267,920 A | 12/1993 | Hibi |
| 5,269,726 A | 12/1993 | Swanson |
| 5,273,501 A | 12/1993 | Schievelbusch |
| 5,318,486 A | 6/1994 | Lutz |
| 5,319,486 A | 6/1994 | Vogel |
| 5,330,396 A | 7/1994 | Lohr |
| 5,355,749 A | 10/1994 | Obara |
| 5,356,348 A | 10/1994 | Bellio |
| 5,375,865 A | 12/1994 | Terry, Sr. |
| 5,379,661 A | 1/1995 | Nakano |
| 5,383,000 A | 1/1995 | Michaloski |
| 5,383,677 A | 1/1995 | Thomas |
| 5,387,000 A | 2/1995 | Sato |
| 5,401,221 A | 3/1995 | Fellows |
| 5,413,540 A | 5/1995 | Streib |
| 5,451,070 A | 9/1995 | Lindsay |
| 5,476,019 A | 12/1995 | Cheever |
| 5,489,003 A | 2/1996 | Ohyama |
| 5,508,574 A | 4/1996 | Vlock |
| 5,514,047 A | 5/1996 | Tibbles |
| 5,526,261 A | 6/1996 | Kallis |
| 5,531,510 A | 7/1996 | Yamane |
| 5,562,564 A | 10/1996 | Folino |
| 5,564,998 A | 10/1996 | Fellows |
| 5,577,423 A | 11/1996 | Mimura |
| 5,582,489 A | 12/1996 | Marzio |
| 5,601,301 A | 2/1997 | Liu |
| 5,607,373 A | 3/1997 | Ochiai |
| 5,645,507 A | 7/1997 | Hathaway |
| 5,651,750 A | 7/1997 | Imanishi |
| 5,664,636 A | 9/1997 | Ikuma |
| 5,669,845 A | 9/1997 | Muramoto |
| 5,669,846 A | 9/1997 | Moroto |
| 5,683,322 A | 11/1997 | Meyerle |
| 5,690,346 A | 11/1997 | Keskitalo |
| 5,701,786 A | 12/1997 | Kawakami |
| 5,720,687 A | 2/1998 | Bennett |
| D391,824 S | 3/1998 | Larson |
| D391,825 S | 3/1998 | Larson |
| 5,722,502 A | 3/1998 | Kubo |
| 5,746,676 A | 5/1998 | Kawase |
| 5,755,303 A | 5/1998 | Yamamoto |
| D396,396 S | 7/1998 | Larson |
| 5,799,541 A | 9/1998 | Arbeiter |
| 5,819,864 A | 10/1998 | Koike |
| 5,823,052 A | 10/1998 | Nobumoto |
| 5,823,058 A | 10/1998 | Arbeiter |
| 5,839,083 A | 11/1998 | Sugiyama |
| 5,846,155 A | 12/1998 | Taniguchi |
| 5,857,387 A | 1/1999 | Larson |
| 5,888,160 A | 3/1999 | Miyata |
| 5,895,337 A | 4/1999 | Fellows |
| 5,899,827 A | 5/1999 | Nakano |
| 5,902,207 A | 5/1999 | Sugihara |
| 5,964,123 A | 10/1999 | Arbeiter |
| 5,967,933 A | 10/1999 | Valdenaire |
| 5,976,054 A | 11/1999 | Yasuoka |
| 5,984,826 A | 11/1999 | Nakano |
| 5,995,895 A | 11/1999 | Watt |
| 6,000,707 A | 12/1999 | Miller |
| 6,003,649 A | 12/1999 | Fischer |
| 6,004,239 A | 12/1999 | Makino |
| 6,006,151 A | 12/1999 | Graf |
| 6,012,538 A | 1/2000 | Sonobe |
| 6,015,359 A | 1/2000 | Kunii |
| 6,019,701 A | 2/2000 | Mori |
| 6,029,990 A | 2/2000 | Busby |

(56) References Cited

U.S. PATENT DOCUMENTS

| | | | |
|---|---|---|---|
| 6,042,132 A | 3/2000 | Suenaga |
| 6,045,477 A | 4/2000 | Schmidt |
| 6,045,481 A | 4/2000 | Kumagai |
| 6,047,230 A | 4/2000 | Spencer |
| 6,053,833 A | 4/2000 | Masaki |
| 6,053,841 A | 4/2000 | Koide |
| 6,054,844 A | 4/2000 | Frank |
| 6,056,661 A | 5/2000 | Schmidt |
| 6,066,067 A | 5/2000 | Greenwood |
| 6,071,210 A | 6/2000 | Kato |
| 6,074,320 A | 6/2000 | Miyata |
| 6,076,846 A | 6/2000 | Clardy |
| 6,079,726 A | 6/2000 | Busby |
| 6,083,139 A | 7/2000 | Deguchi |
| 6,085,140 A | 7/2000 | Choi |
| 6,085,521 A | 7/2000 | Folsom |
| 6,086,506 A | 7/2000 | Petersmann |
| 6,095,940 A | 8/2000 | Xiaolan |
| 6,095,945 A | 8/2000 | Graf |
| 6,099,431 A | 8/2000 | Hoge |
| 6,101,895 A | 8/2000 | Yamane |
| 6,113,513 A | 9/2000 | Itoh |
| 6,119,539 A | 9/2000 | Papanicolaou |
| 6,119,800 A | 9/2000 | McComber |
| 6,125,314 A | 9/2000 | Graf |
| 6,146,297 A | 11/2000 | Kimura |
| 6,159,126 A | 12/2000 | Oshidari |
| 6,171,210 B1 | 1/2001 | Miyata |
| 6,171,212 B1 | 1/2001 | Reuschel |
| 6,174,260 B1 | 1/2001 | Tsukada |
| 6,182,000 B1 | 1/2001 | Ohta |
| 6,186,922 B1 | 2/2001 | Bursal |
| 6,188,945 B1 | 2/2001 | Graf |
| 6,203,238 B1 | 3/2001 | Otto |
| 6,210,297 B1 | 4/2001 | Knight |
| 6,217,473 B1 | 4/2001 | Ueda |
| 6,217,478 B1 | 4/2001 | Vohmann |
| 6,241,636 B1 | 6/2001 | Miller |
| 6,243,638 B1 | 6/2001 | Abo |
| 6,251,038 B1 | 6/2001 | Ishikawa |
| 6,251,043 B1 | 6/2001 | Gierling |
| 6,258,003 B1 | 7/2001 | Hirano |
| 6,261,200 B1 | 7/2001 | Miyata |
| 6,266,931 B1 | 7/2001 | Erickson |
| 6,296,593 B1 | 10/2001 | Gotou |
| 6,311,113 B1 | 10/2001 | Danz |
| 6,312,358 B1 | 11/2001 | Goi |
| 6,322,475 B2 | 11/2001 | Miller |
| 6,325,386 B1 | 12/2001 | Shoge |
| 6,340,067 B1 | 1/2002 | Fujiwara |
| 6,356,817 B1 | 3/2002 | Abe |
| 6,358,174 B1 | 3/2002 | Folsom |
| 6,358,178 B1 | 3/2002 | Wittkopp |
| 6,367,833 B1 | 4/2002 | Horiuchi |
| 6,371,878 B1 | 4/2002 | Bowen |
| 6,375,412 B1 | 4/2002 | Dial |
| 6,390,945 B1 | 5/2002 | Young |
| 6,390,946 B1 | 5/2002 | Hibi |
| 6,406,399 B1 | 6/2002 | Xiaolan |
| 6,414,401 B1 | 7/2002 | Kuroda |
| 6,419,608 B1 | 7/2002 | Miller |
| 6,425,838 B1 | 7/2002 | Matsubara |
| 6,434,960 B1 | 8/2002 | Rousseau |
| 6,440,035 B2 | 8/2002 | Tsukada |
| 6,440,037 B2 | 8/2002 | Takagi |
| 6,449,548 B1 | 9/2002 | Jain |
| 6,459,978 B2 | 10/2002 | Taniguchi |
| 6,461,268 B1 | 10/2002 | Milner |
| 6,470,252 B2 | 10/2002 | Tashiro |
| 6,482,094 B2 | 11/2002 | Kefes |
| 6,492,785 B1 | 12/2002 | Kasten |
| 6,494,805 B2 | 12/2002 | Ooyama |
| 6,499,373 B2 | 12/2002 | Van Cor |
| 6,499,958 B2 | 12/2002 | Haugen |
| 6,513,405 B1 | 2/2003 | Stuermer |
| 6,514,175 B2 | 2/2003 | Taniguchi |
| 6,520,878 B1 | 2/2003 | Leclair |
| 6,522,965 B1 | 2/2003 | Gierling |
| 6,527,662 B2 | 3/2003 | Miyata |
| 6,532,890 B2 | 3/2003 | Chen |
| 6,551,210 B2 | 4/2003 | Miller |
| 6,558,285 B1 | 5/2003 | Sieber |
| 6,561,941 B2 | 5/2003 | Nakano |
| 6,571,920 B1 | 6/2003 | Sturmer |
| 6,575,047 B2 | 6/2003 | Reik |
| 6,588,296 B2 | 7/2003 | Wessel |
| 6,658,338 B2 | 12/2003 | Joe |
| 6,659,901 B2 | 12/2003 | Sakai |
| 6,672,418 B1 | 1/2004 | Makino |
| 6,676,559 B2 | 1/2004 | Miller |
| 6,679,109 B2 | 1/2004 | Gierling |
| 6,681,652 B2 | 1/2004 | Auer |
| 6,682,432 B1 | 1/2004 | Shinozuka |
| 6,684,143 B2 | 1/2004 | Friedrich |
| 6,689,012 B2 | 2/2004 | Miller |
| 6,694,241 B2 | 2/2004 | Kim |
| 6,718,247 B1 | 4/2004 | Graf |
| 6,721,637 B2 | 4/2004 | Abe |
| 6,723,014 B2 | 4/2004 | Shinso |
| 6,723,016 B2 | 4/2004 | Sumi |
| 6,805,654 B2 | 10/2004 | Nishii |
| 6,808,053 B2 | 10/2004 | Kirkwood |
| 6,839,617 B2 | 1/2005 | Mensler |
| 6,849,020 B2 | 2/2005 | Sumi |
| 6,859,709 B2 | 2/2005 | Joe |
| 6,868,949 B2 | 3/2005 | Braford, Jr. |
| 6,909,953 B2 | 6/2005 | Joe |
| 6,931,316 B2 | 8/2005 | Joe |
| 6,932,739 B2 | 8/2005 | Miyata |
| 6,942,593 B2 | 9/2005 | Nishii |
| 6,945,903 B2 | 9/2005 | Miller |
| 6,949,049 B2 | 9/2005 | Miller |
| 6,958,029 B2 | 10/2005 | Inoue |
| 6,991,575 B2 | 1/2006 | Inoue |
| 6,991,579 B2 | 1/2006 | Kobayashi |
| 6,994,189 B2 | 2/2006 | Chen |
| 7,000,496 B2 | 2/2006 | Wessel |
| 7,004,487 B2 | 2/2006 | Matsumoto |
| 7,011,600 B2 | 3/2006 | Miller |
| 7,011,601 B2 | 3/2006 | Miller |
| 7,011,602 B2 | 3/2006 | Makiyama |
| 7,014,591 B2 | 3/2006 | Miller |
| 7,029,418 B2 | 4/2006 | Taketsuna |
| 7,032,914 B2 | 4/2006 | Miller |
| 7,036,620 B2 | 5/2006 | Miller |
| 7,044,884 B2 | 5/2006 | Miller |
| 7,063,195 B2 | 6/2006 | Berhan |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,077,777 B2 | 7/2006 | Miyata |
| 7,086,979 B2 | 8/2006 | Frenken |
| 7,086,981 B2 | 8/2006 | Ali |
| 7,094,171 B2 | 8/2006 | Inoue |
| 7,111,860 B1 | 9/2006 | Grimaldos |
| 7,112,158 B2 | 9/2006 | Miller |
| 7,112,159 B2 | 9/2006 | Miller |
| 7,125,297 B2 | 10/2006 | Miller |
| 7,131,930 B2 | 11/2006 | Miller |
| 7,140,999 B2 | 11/2006 | Miller |
| 7,147,586 B2 | 12/2006 | Miller |
| 7,153,233 B2 | 12/2006 | Miller |
| 7,156,770 B2 | 1/2007 | Miller |
| 7,160,220 B2 | 1/2007 | Shinojima |
| 7,160,222 B2 | 1/2007 | Miller |
| 7,163,485 B2 | 1/2007 | Miller |
| 7,163,486 B2 | 1/2007 | Miller |
| 7,163,846 B2 | 1/2007 | Sakai |
| 7,166,052 B2 | 1/2007 | Miller |
| 7,166,056 B2 | 1/2007 | Miller |
| 7,166,057 B2 | 1/2007 | Miller |
| 7,166,058 B2 | 1/2007 | Miller |
| 7,169,076 B2 | 1/2007 | Miller |

(56) References Cited

U.S. PATENT DOCUMENTS

| | | |
|---|---|---|
| 7,172,529 B2 | 2/2007 | Miller |
| 7,175,564 B2 | 2/2007 | Miller |
| 7,175,565 B2 | 2/2007 | Miller |
| 7,175,566 B2 | 2/2007 | Miller |
| 7,192,381 B2 | 3/2007 | Miller |
| 7,197,915 B2 | 4/2007 | Luh |
| 7,198,582 B2 | 4/2007 | Miller |
| 7,198,583 B2 | 4/2007 | Miller |
| 7,198,584 B2 | 4/2007 | Miller |
| 7,198,585 B2 | 4/2007 | Miller |
| 7,201,693 B2 | 4/2007 | Miller |
| 7,201,694 B2 | 4/2007 | Miller |
| 7,201,695 B2 | 4/2007 | Miller |
| 7,204,777 B2 | 4/2007 | Miller |
| 7,207,918 B2 | 4/2007 | Shimazu |
| 7,214,159 B2 | 5/2007 | Miller |
| 7,217,215 B2 | 5/2007 | Miller |
| 7,217,216 B2 | 5/2007 | Inoue |
| 7,217,219 B2 | 5/2007 | Miller |
| 7,217,220 B2 | 5/2007 | Careau |
| 7,226,379 B2 | 6/2007 | Ibamoto |
| 7,232,395 B2 | 6/2007 | Miller |
| 7,234,873 B2 | 6/2007 | Kato |
| 7,235,031 B2 | 6/2007 | Miller |
| 7,238,136 B2 | 7/2007 | Miller |
| 7,238,137 B2 | 7/2007 | Miller |
| 7,238,138 B2 | 7/2007 | Miller |
| 7,238,139 B2 | 7/2007 | Roethler |
| 7,246,672 B2 | 7/2007 | Shirai |
| 7,250,018 B2 | 7/2007 | Miller |
| 7,261,663 B2 | 8/2007 | Miller |
| 7,275,610 B2 | 10/2007 | Kuang |
| 7,285,068 B2 | 10/2007 | Hosoi |
| 7,288,042 B2 | 10/2007 | Miller |
| 7,288,043 B2 | 10/2007 | Shioiri |
| 7,320,660 B2 | 1/2008 | Miller |
| 7,322,901 B2 | 1/2008 | Miller |
| 7,343,236 B2 | 3/2008 | Wilson |
| 7,347,801 B2 | 3/2008 | Guenter |
| 7,383,748 B2 | 6/2008 | Rankin |
| 7,383,749 B2 | 6/2008 | Schaefer |
| 7,384,370 B2 | 6/2008 | Miller |
| 7,393,300 B2 | 7/2008 | Miller |
| 7,393,302 B2 | 7/2008 | Miller |
| 7,393,303 B2 | 7/2008 | Miller |
| 7,395,731 B2 | 7/2008 | Miller |
| 7,396,209 B2 | 7/2008 | Miller |
| 7,402,122 B2 | 7/2008 | Miller |
| 7,410,443 B2 | 8/2008 | Miller |
| 7,419,451 B2 | 9/2008 | Miller |
| 7,422,541 B2 | 9/2008 | Miller |
| 7,422,546 B2 | 9/2008 | Miller |
| 7,427,253 B2 | 9/2008 | Miller |
| 7,431,677 B2 | 10/2008 | Miller |
| 7,452,297 B2 | 11/2008 | Miller |
| 7,455,611 B2 | 11/2008 | Miller |
| 7,455,617 B2 | 11/2008 | Miller |
| 7,462,123 B2 | 12/2008 | Miller |
| 7,462,127 B2 | 12/2008 | Miller |
| 7,470,210 B2 | 12/2008 | Miller |
| 7,478,885 B2 | 1/2009 | Urabe |
| 7,481,736 B2 | 1/2009 | Miller |
| 7,510,499 B2 | 3/2009 | Miller |
| 7,540,818 B2 | 6/2009 | Miller |
| 7,547,264 B2 | 6/2009 | Usoro |
| 7,574,935 B2 | 8/2009 | Rohs |
| 7,591,755 B2 | 9/2009 | Petrzik |
| 7,632,203 B2 | 12/2009 | Miller |
| 7,651,437 B2 | 1/2010 | Miller |
| 7,654,928 B2 | 2/2010 | Miller |
| 7,670,243 B2 | 3/2010 | Miller |
| 7,686,729 B2 | 3/2010 | Miller |
| 7,717,815 B2 | 5/2010 | Tenberge |
| 7,727,101 B2 | 6/2010 | Miller |
| 7,727,106 B2 | 6/2010 | Maheu |
| 7,727,107 B2 | 6/2010 | Miller |
| 7,727,108 B2 | 6/2010 | Miller |
| 7,727,110 B2 | 6/2010 | Miller |
| 7,727,115 B2 | 6/2010 | Serkh |
| 7,731,300 B2 | 6/2010 | Gerstenslager |
| 7,731,615 B2 | 6/2010 | Miller |
| 7,762,919 B2 | 7/2010 | Smithson |
| 7,762,920 B2 | 7/2010 | Smithson |
| 7,770,674 B2 | 8/2010 | Miles |
| 7,785,228 B2 | 8/2010 | Smithson |
| 7,828,685 B2 | 11/2010 | Miller |
| 7,837,592 B2 | 11/2010 | Miller |
| 7,871,353 B2 | 1/2011 | Nichols |
| 7,882,762 B2 | 2/2011 | Armstrong |
| 7,883,442 B2 | 2/2011 | Miller |
| 7,885,747 B2 | 2/2011 | Miller |
| 7,887,032 B2 | 2/2011 | Malone |
| 7,909,723 B2 | 3/2011 | Triller |
| 7,909,727 B2 | 3/2011 | Smithson |
| 7,914,029 B2 | 3/2011 | Miller |
| 7,959,533 B2 | 6/2011 | Nichols |
| 7,963,880 B2 | 6/2011 | Smithson |
| 7,967,719 B2 | 6/2011 | Smithson |
| 7,976,426 B2 | 7/2011 | Smithson |
| 8,066,613 B2 | 11/2011 | Smithson |
| 8,066,614 B2 | 11/2011 | Miller |
| 8,070,635 B2 | 12/2011 | Miller |
| 8,087,482 B2 | 1/2012 | Miles |
| 8,123,653 B2 | 2/2012 | Smithson |
| 8,133,149 B2 | 3/2012 | Smithson |
| 8,142,323 B2 | 3/2012 | Tsuchiya |
| 8,167,759 B2 | 5/2012 | Pohl |
| 8,171,636 B2 | 5/2012 | Smithson |
| 8,197,380 B2 | 6/2012 | Heinzelmann |
| 8,230,961 B2 | 7/2012 | Schneidewind |
| 8,262,536 B2 | 9/2012 | Nichols |
| 8,267,829 B2 | 9/2012 | Miller |
| 8,313,404 B2 | 11/2012 | Carter |
| 8,313,405 B2 | 11/2012 | Bazyn |
| 8,317,650 B2 | 11/2012 | Nichols |
| 8,317,651 B2 | 11/2012 | Lohr |
| 8,321,097 B2 | 11/2012 | Vasiliotis |
| 8,321,103 B2 | 11/2012 | Sakaue |
| 8,342,999 B2 | 1/2013 | Miller |
| 8,360,917 B2 | 1/2013 | Nichols |
| 8,376,889 B2 | 2/2013 | Hoffman |
| 8,376,903 B2 | 2/2013 | Pohl |
| 8,382,631 B2 | 2/2013 | Hoffman |
| 8,382,637 B2 | 2/2013 | Tange |
| 8,393,989 B2 | 3/2013 | Pohl |
| 8,398,518 B2 | 3/2013 | Nichols |
| 8,447,480 B2 | 5/2013 | Usukura |
| 8,469,853 B2 | 6/2013 | Miller |
| 8,469,856 B2 | 6/2013 | Thomassy |
| 8,480,529 B2 | 7/2013 | Pohl |
| 8,496,554 B2 | 7/2013 | Pohl |
| 8,506,452 B2 | 8/2013 | Pohl |
| 8,512,195 B2 | 8/2013 | Lohr |
| 8,517,888 B1 | 8/2013 | Brookins |
| 8,535,199 B2 | 9/2013 | Lohr |
| 8,550,949 B2 | 10/2013 | Miller |
| 8,585,528 B2 | 11/2013 | Carter |
| 8,585,543 B1 | 11/2013 | Davis |
| 8,608,609 B2 | 12/2013 | Sherrill |
| 8,622,866 B2 | 1/2014 | Bazyn |
| 8,622,871 B2 | 1/2014 | Hoff |
| 8,626,409 B2 | 1/2014 | Vasiliotis |
| 8,628,443 B2 | 1/2014 | Miller |
| 8,641,572 B2 | 2/2014 | Nichols |
| 8,641,577 B2 | 2/2014 | Nichols |
| 8,663,050 B2 | 3/2014 | Nichols |
| 8,663,052 B2 | 3/2014 | Sich |
| 8,678,974 B2 | 3/2014 | Lohr |
| 8,682,545 B2 | 3/2014 | Jiang |
| 8,688,337 B2 | 4/2014 | Takanami |
| 8,708,360 B2 | 4/2014 | Miller |
| 8,721,485 B2 | 5/2014 | Lohr |
| 8,738,255 B2 | 5/2014 | Carter |
| 8,776,633 B2 | 7/2014 | Armstrong |

(56) References Cited

U.S. PATENT DOCUMENTS

| | | |
|---|---|---|
| 8,784,248 B2 | 7/2014 | Murakami |
| 8,790,214 B2 | 7/2014 | Lohr |
| 8,814,739 B1 | 8/2014 | Hamrin |
| 8,818,661 B2 | 8/2014 | Keilers |
| 8,827,856 B1 | 9/2014 | Younggren |
| 8,827,864 B2 | 9/2014 | Durack |
| 8,845,485 B2 | 9/2014 | Smithson |
| 8,852,050 B2 | 10/2014 | Thomassy |
| 8,870,711 B2 | 10/2014 | Pohl |
| 8,888,643 B2 | 11/2014 | Lohr |
| 8,900,085 B2 | 12/2014 | Pohl |
| 8,920,021 B2 | 12/2014 | Mertenat |
| 8,920,285 B2 | 12/2014 | Smithson |
| 8,924,111 B2 | 12/2014 | Fuller |
| 8,956,262 B2 | 2/2015 | Tomomatsu |
| 8,961,363 B2 | 2/2015 | Shiina |
| 8,968,152 B2 | 3/2015 | Beaudoin |
| 8,992,376 B2 | 3/2015 | Ogawa |
| 8,996,263 B2 | 3/2015 | Quinn, Jr. |
| 9,017,207 B2 | 4/2015 | Pohl |
| 9,022,889 B2 | 5/2015 | Miller |
| 9,046,158 B2 | 6/2015 | Miller |
| 9,052,000 B2 | 6/2015 | Cooper |
| 9,074,674 B2 | 7/2015 | Nichols |
| 9,086,145 B2 | 7/2015 | Pohl |
| 9,121,464 B2 | 9/2015 | Nichols |
| 9,182,018 B2 | 11/2015 | Bazyn |
| 9,239,099 B2 | 1/2016 | Carter |
| 9,249,880 B2 | 2/2016 | Vasiliotis |
| 9,273,760 B2 | 3/2016 | Pohl |
| 9,279,482 B2 | 3/2016 | Nichols |
| 9,291,251 B2 | 3/2016 | Lohr |
| 9,328,807 B2 | 5/2016 | Carter |
| 9,341,246 B2 | 5/2016 | Miller |
| 9,360,089 B2 | 6/2016 | Lohr |
| 9,365,203 B2 | 6/2016 | Keilers |
| 9,371,894 B2 | 6/2016 | Carter |
| 9,388,896 B2 | 7/2016 | Hibino |
| 9,506,562 B2 | 11/2016 | Miller |
| 9,528,561 B2 | 12/2016 | Nichols |
| 9,541,179 B2 | 1/2017 | Cooper |
| 9,574,642 B2 | 2/2017 | Pohl |
| 9,574,643 B2 | 2/2017 | Pohl |
| 9,611,921 B2 | 4/2017 | Thomassy |
| 9,618,100 B2 | 4/2017 | Lohr |
| 9,656,672 B2 | 5/2017 | Schieffelin |
| 9,676,391 B2 | 6/2017 | Carter |
| 9,677,650 B2 | 6/2017 | Nichols |
| 9,683,638 B2 | 6/2017 | Kolstrup |
| 9,683,640 B2 | 6/2017 | Lohr |
| 9,709,138 B2 | 7/2017 | Miller |
| 9,726,282 B2 | 8/2017 | Pohl |
| 9,732,848 B2 | 8/2017 | Miller |
| 9,739,375 B2 | 8/2017 | Vasiliotis |
| 9,833,201 B2 | 12/2017 | Niederberger |
| 9,845,133 B2 | 12/2017 | Craven |
| 9,850,993 B2 | 12/2017 | Bazyn |
| 9,869,388 B2 | 1/2018 | Pohl |
| 9,878,717 B2 | 1/2018 | Keilers |
| 9,878,719 B2 | 1/2018 | Carter |
| 9,903,450 B2 | 2/2018 | Thomassy |
| 9,909,657 B2 | 3/2018 | Uchino |
| 9,920,823 B2 | 3/2018 | Nichols |
| 9,945,456 B2 | 4/2018 | Nichols |
| 9,950,608 B2 | 4/2018 | Miller |
| 9,963,199 B2 | 5/2018 | Hancock |
| 9,975,557 B2 | 5/2018 | Park |
| 10,023,266 B2 | 7/2018 | Contello |
| 10,036,453 B2 | 7/2018 | Smithson |
| 10,047,861 B2 | 8/2018 | Thomassy |
| 10,056,811 B2 | 8/2018 | Pohl |
| 10,066,712 B2 | 9/2018 | Lohr |
| 10,066,713 B2 | 9/2018 | Nichols |
| 10,088,026 B2 | 10/2018 | Versteyhe |
| 10,100,927 B2 | 10/2018 | Quinn, Jr. |
| 10,197,147 B2 | 2/2019 | Lohr |
| 10,208,840 B2 | 2/2019 | Nichols |
| 10,252,881 B2 | 4/2019 | Hiltunen |
| 10,253,859 B2 | 4/2019 | Schoolcraft |
| 10,253,880 B2 | 4/2019 | Pohl |
| 10,253,881 B2 | 4/2019 | Hamrin |
| 10,260,607 B2 | 4/2019 | Carter |
| 10,323,732 B2 | 6/2019 | Nichols |
| 10,400,872 B2 | 9/2019 | Lohr |
| 10,428,915 B2 | 10/2019 | Thomassy |
| 10,428,939 B2 | 10/2019 | Miller |
| 10,458,526 B2 | 10/2019 | Nichols |
| 10,634,224 B2 | 4/2020 | Lohr |
| 10,703,372 B2 | 7/2020 | Carter |
| 10,704,657 B2 | 7/2020 | Thomassy |
| 10,704,687 B2 | 7/2020 | Vasiliotis |
| 10,711,869 B2 | 7/2020 | Miller |
| 10,800,421 B2 | 10/2020 | Cho |
| 10,920,882 B2 | 2/2021 | Thomassy |
| 10,975,916 B2 | 4/2021 | Okada |
| 2001/0008192 A1 | 7/2001 | Morisawa |
| 2001/0023217 A1 | 9/2001 | Miyagawa |
| 2001/0041644 A1 | 11/2001 | Yasuoka |
| 2001/0044358 A1 | 11/2001 | Taniguchi |
| 2001/0044361 A1 | 11/2001 | Taniguchi |
| 2001/0046920 A1 | 11/2001 | Sugihara |
| 2002/0017819 A1 | 2/2002 | Chen |
| 2002/0019285 A1 | 2/2002 | Henzler |
| 2002/0025875 A1 | 2/2002 | Tsujioka |
| 2002/0028722 A1 | 3/2002 | Sakai |
| 2002/0037786 A1 | 3/2002 | Hirano |
| 2002/0045511 A1 | 4/2002 | Geiberger |
| 2002/0049113 A1 | 4/2002 | Watanabe |
| 2002/0117860 A1 | 8/2002 | Man |
| 2002/0128107 A1 | 9/2002 | Wakayama |
| 2002/0151401 A1 | 10/2002 | Lemanski |
| 2002/0161503 A1 | 10/2002 | Joe |
| 2002/0169051 A1 | 11/2002 | Oshidari |
| 2002/0179348 A1 | 12/2002 | Tamai |
| 2002/0189524 A1 | 12/2002 | Chen |
| 2003/0015358 A1 | 1/2003 | Abe |
| 2003/0015874 A1 | 1/2003 | Abe |
| 2003/0022753 A1 | 1/2003 | Mizuno |
| 2003/0036456 A1 | 2/2003 | Skrabs |
| 2003/0096674 A1 | 5/2003 | Uno |
| 2003/0132051 A1 | 7/2003 | Nishii |
| 2003/0135316 A1 | 7/2003 | Kawamura |
| 2003/0144105 A1 | 7/2003 | O'Hora |
| 2003/0151300 A1 | 8/2003 | Goss |
| 2003/0160420 A1 | 8/2003 | Fukuda |
| 2003/0181286 A1 | 9/2003 | Miller |
| 2003/0216216 A1 | 11/2003 | Inoue |
| 2003/0221892 A1 | 12/2003 | Matsumoto |
| 2004/0038772 A1 | 2/2004 | McIndoe |
| 2004/0051375 A1 | 3/2004 | Uno |
| 2004/0058772 A1 | 3/2004 | Inoue |
| 2004/0067816 A1 | 4/2004 | Taketsuna |
| 2004/0082421 A1 | 4/2004 | Wafzig |
| 2004/0087412 A1 | 5/2004 | Mori |
| 2004/0092359 A1 | 5/2004 | Imanishi |
| 2004/0119345 A1 | 6/2004 | Takano |
| 2004/0171452 A1 | 9/2004 | Miller |
| 2004/0171457 A1 | 9/2004 | Fuller |
| 2004/0204283 A1 | 10/2004 | Inoue |
| 2004/0224808 A1 | 11/2004 | Miller |
| 2004/0231331 A1 | 11/2004 | Iwanami |
| 2004/0254047 A1 | 12/2004 | Frank |
| 2005/0037876 A1 | 2/2005 | Unno |
| 2005/0037886 A1 | 2/2005 | Lemanski |
| 2005/0064986 A1 | 3/2005 | Ginglas |
| 2005/0073127 A1 | 4/2005 | Miller |
| 2005/0079948 A1 | 4/2005 | Miller |
| 2005/0085326 A1 | 4/2005 | Miller |
| 2005/0085327 A1 | 4/2005 | Miller |
| 2005/0085334 A1 | 4/2005 | Miller |
| 2005/0085336 A1 | 4/2005 | Miller |
| 2005/0085337 A1 | 4/2005 | Miller |
| 2005/0085338 A1 | 4/2005 | Miller |
| 2005/0085979 A1 | 4/2005 | Carlson |

(56) References Cited

U.S. PATENT DOCUMENTS

| | | |
|---|---|---|
| 2005/0096176 A1 | 5/2005 | Miller |
| 2005/0096179 A1 | 5/2005 | Miller |
| 2005/0113202 A1 | 5/2005 | Miller |
| 2005/0113210 A1 | 5/2005 | Miller |
| 2005/0117983 A1 | 6/2005 | Miller |
| 2005/0119086 A1 | 6/2005 | Miller |
| 2005/0119087 A1 | 6/2005 | Miller |
| 2005/0119090 A1 | 6/2005 | Miller |
| 2005/0119093 A1 | 6/2005 | Miller |
| 2005/0124453 A1 | 6/2005 | Miller |
| 2005/0124456 A1 | 6/2005 | Miller |
| 2005/0130784 A1 | 6/2005 | Miller |
| 2005/0137046 A1 | 6/2005 | Miller |
| 2005/0137051 A1 | 6/2005 | Miller |
| 2005/0137052 A1 | 6/2005 | Miller |
| 2005/0148422 A1 | 7/2005 | Miller |
| 2005/0148423 A1 | 7/2005 | Miller |
| 2005/0153808 A1 | 7/2005 | Miller |
| 2005/0153809 A1 | 7/2005 | Miller |
| 2005/0153810 A1 | 7/2005 | Miller |
| 2005/0159265 A1 | 7/2005 | Miller |
| 2005/0159266 A1 | 7/2005 | Miller |
| 2005/0159267 A1 | 7/2005 | Miller |
| 2005/0164819 A1 | 7/2005 | Miller |
| 2005/0170927 A1 | 8/2005 | Miller |
| 2005/0176544 A1 | 8/2005 | Miller |
| 2005/0176545 A1 | 8/2005 | Miller |
| 2005/0178893 A1 | 8/2005 | Miller |
| 2005/0181905 A1 | 8/2005 | Ali |
| 2005/0184580 A1 | 8/2005 | Kuan |
| 2005/0197231 A1 | 9/2005 | Miller |
| 2005/0209041 A1 | 9/2005 | Miller |
| 2005/0227809 A1 | 10/2005 | Bitzer |
| 2005/0229731 A1 | 10/2005 | Parks |
| 2005/0233846 A1 | 10/2005 | Green |
| 2005/0255957 A1 | 11/2005 | Miller |
| 2006/0000684 A1 | 1/2006 | Agner |
| 2006/0006008 A1 | 1/2006 | Brunemann |
| 2006/0052204 A1 | 3/2006 | Eckert |
| 2006/0054422 A1 | 3/2006 | Dimsey |
| 2006/0084549 A1 | 4/2006 | Smithson |
| 2006/0108956 A1 | 5/2006 | Clark |
| 2006/0111212 A9 | 5/2006 | Xiaolan |
| 2006/0154775 A1 | 7/2006 | Ali |
| 2006/0172829 A1 | 8/2006 | Ishio |
| 2006/0180363 A1 | 8/2006 | Uchisasai |
| 2006/0223667 A1 | 10/2006 | Nakazeki |
| 2006/0234822 A1 | 10/2006 | Morscheck |
| 2006/0234826 A1 | 10/2006 | Moehlmann |
| 2006/0276299 A1 | 12/2006 | Imanishi |
| 2007/0004552 A1 | 1/2007 | Matsudaira |
| 2007/0004554 A1 | 1/2007 | Hans |
| 2007/0004556 A1 | 1/2007 | Rohs |
| 2007/0041823 A1 | 2/2007 | Miller |
| 2007/0049450 A1 | 3/2007 | Miller |
| 2007/0082770 A1 | 4/2007 | Nihei |
| 2007/0099753 A1 | 5/2007 | Matsui |
| 2007/0142161 A1 | 6/2007 | Miller |
| 2007/0149342 A1 | 6/2007 | Guenter |
| 2007/0155552 A1 | 7/2007 | De Cloe |
| 2007/0155567 A1 | 7/2007 | Miller |
| 2007/0155580 A1 | 7/2007 | Nichols |
| 2007/0167274 A1 | 7/2007 | Petrzik |
| 2007/0167275 A1 | 7/2007 | Miller |
| 2007/0167276 A1 | 7/2007 | Miller |
| 2007/0167277 A1 | 7/2007 | Miller |
| 2007/0167278 A1 | 7/2007 | Miller |
| 2007/0167279 A1 | 7/2007 | Miller |
| 2007/0167280 A1 | 7/2007 | Miller |
| 2007/0179013 A1 | 8/2007 | Miller |
| 2007/0193391 A1 | 8/2007 | Armstrong |
| 2007/0197337 A1 | 8/2007 | Miller |
| 2007/0219048 A1 | 9/2007 | Yamaguchi |
| 2007/0219696 A1 | 9/2007 | Miller |
| 2007/0228687 A1 | 10/2007 | Parker |
| 2007/0232423 A1 | 10/2007 | Katou |
| 2007/0245846 A1 | 10/2007 | Armstrong |
| 2007/0270265 A1 | 11/2007 | Miller |
| 2007/0270266 A1 | 11/2007 | Miller |
| 2007/0270267 A1 | 11/2007 | Miller |
| 2007/0270268 A1 | 11/2007 | Miller |
| 2007/0270269 A1 | 11/2007 | Miller |
| 2007/0270270 A1 | 11/2007 | Miller |
| 2007/0270271 A1 | 11/2007 | Miller |
| 2007/0270272 A1 | 11/2007 | Miller |
| 2007/0270278 A1 | 11/2007 | Miller |
| 2007/0275809 A1 | 11/2007 | Miller |
| 2007/0281819 A1 | 12/2007 | Miller |
| 2007/0287578 A1 | 12/2007 | Miller |
| 2007/0287579 A1 | 12/2007 | Miller |
| 2007/0287580 A1 | 12/2007 | Miller |
| 2008/0004008 A1 | 1/2008 | Nicol |
| 2008/0009389 A1 | 1/2008 | Jacobs |
| 2008/0032852 A1 | 2/2008 | Smithson |
| 2008/0032853 A1 | 2/2008 | Smithson |
| 2008/0032854 A1 | 2/2008 | Smithson |
| 2008/0034585 A1 | 2/2008 | Smithson |
| 2008/0034586 A1 | 2/2008 | Smithson |
| 2008/0039269 A1 | 2/2008 | Smithson |
| 2008/0039270 A1 | 2/2008 | Smithson |
| 2008/0039271 A1 | 2/2008 | Smithson |
| 2008/0039272 A1 | 2/2008 | Smithson |
| 2008/0039273 A1 | 2/2008 | Smithson |
| 2008/0039274 A1 | 2/2008 | Smithson |
| 2008/0039275 A1 | 2/2008 | Smithson |
| 2008/0039276 A1 | 2/2008 | Smithson |
| 2008/0039277 A1 | 2/2008 | Smithson |
| 2008/0040008 A1 | 2/2008 | Smithson |
| 2008/0070729 A1 | 3/2008 | Miller |
| 2008/0071436 A1* | 3/2008 | Dube ............... B62M 6/50 701/22 |
| 2008/0073136 A1 | 3/2008 | Miller |
| 2008/0073137 A1 | 3/2008 | Miller |
| 2008/0073467 A1 | 3/2008 | Miller |
| 2008/0079236 A1 | 4/2008 | Miller |
| 2008/0081715 A1 | 4/2008 | Miller |
| 2008/0081728 A1 | 4/2008 | Faulring |
| 2008/0085795 A1 | 4/2008 | Miller |
| 2008/0085796 A1 | 4/2008 | Miller |
| 2008/0085797 A1 | 4/2008 | Miller |
| 2008/0085798 A1 | 4/2008 | Miller |
| 2008/0121486 A1 | 5/2008 | Miller |
| 2008/0121487 A1 | 5/2008 | Miller |
| 2008/0125281 A1 | 5/2008 | Miller |
| 2008/0125282 A1 | 5/2008 | Miller |
| 2008/0132373 A1 | 6/2008 | Miller |
| 2008/0132377 A1 | 6/2008 | Miller |
| 2008/0139363 A1 | 6/2008 | Williams |
| 2008/0141809 A1 | 6/2008 | Miller |
| 2008/0141810 A1 | 6/2008 | Miller |
| 2008/0146403 A1 | 6/2008 | Miller |
| 2008/0146404 A1 | 6/2008 | Miller |
| 2008/0149407 A1 | 6/2008 | Shibata |
| 2008/0161151 A1 | 7/2008 | Miller |
| 2008/0183358 A1 | 7/2008 | Thomson |
| 2008/0188345 A1 | 8/2008 | Miller |
| 2008/0200300 A1 | 8/2008 | Smithson |
| 2008/0228362 A1 | 9/2008 | Muller |
| 2008/0236319 A1 | 10/2008 | Nichols |
| 2008/0248917 A1 | 10/2008 | Nichols |
| 2008/0261771 A1 | 10/2008 | Nichols |
| 2008/0284170 A1 | 11/2008 | Cory |
| 2008/0305920 A1 | 12/2008 | Nishii |
| 2009/0011907 A1 | 1/2009 | Radow |
| 2009/0023545 A1 | 1/2009 | Beaudoin |
| 2009/0055061 A1 | 2/2009 | Zhu |
| 2009/0062062 A1 | 3/2009 | Choi |
| 2009/0082169 A1 | 3/2009 | Kolstrup |
| 2009/0107454 A1 | 4/2009 | Hiyoshi |
| 2009/0132135 A1 | 5/2009 | Quinn, Jr. |
| 2009/0164076 A1 | 6/2009 | Vasiliotis |
| 2009/0189397 A1 | 7/2009 | Miller |
| 2009/0221391 A1 | 9/2009 | Bazyn |
| 2009/0251013 A1 | 10/2009 | Vollmer |

(56) References Cited

U.S. PATENT DOCUMENTS

| | | |
|---|---|---|
| 2009/0280949 A1 | 11/2009 | Lohr |
| 2009/0312145 A1 | 12/2009 | Pohl |
| 2009/0318261 A1 | 12/2009 | Tabata |
| 2010/0056322 A1 | 3/2010 | Thomassy |
| 2010/0093479 A1 | 4/2010 | Carter |
| 2010/0093480 A1 | 4/2010 | Pohl |
| 2010/0093485 A1 | 4/2010 | Pohl |
| 2010/0120577 A1 | 5/2010 | Gu |
| 2010/0131164 A1 | 5/2010 | Carter |
| 2010/0145573 A1 | 6/2010 | Vasilescu |
| 2010/0181130 A1 | 7/2010 | Chou |
| 2010/0198453 A1 | 8/2010 | Dorogusker |
| 2010/0228405 A1 | 9/2010 | Morgal |
| 2010/0264620 A1 | 10/2010 | Miles |
| 2010/0267510 A1 | 10/2010 | Nichols |
| 2010/0313614 A1 | 12/2010 | Rzepecki |
| 2011/0034284 A1 | 2/2011 | Pohl |
| 2011/0088503 A1 | 4/2011 | Armstrong |
| 2011/0105274 A1 | 5/2011 | Lohr |
| 2011/0127096 A1 | 6/2011 | Schneidewind |
| 2011/0172050 A1 | 7/2011 | Nichols |
| 2011/0178684 A1 | 7/2011 | Umemoto |
| 2011/0184614 A1 | 7/2011 | Keilers |
| 2011/0190093 A1 | 8/2011 | Bishop |
| 2011/0218072 A1 | 9/2011 | Lohr |
| 2011/0230297 A1 | 9/2011 | Shiina |
| 2011/0237385 A1 | 9/2011 | Andre Parise |
| 2011/0254673 A1 | 10/2011 | Jean |
| 2011/0291507 A1 | 12/2011 | Post |
| 2011/0319222 A1 | 12/2011 | Ogawa |
| 2012/0029744 A1 | 2/2012 | Yun |
| 2012/0035011 A1 | 2/2012 | Menachem |
| 2012/0035015 A1 | 2/2012 | Ogawa |
| 2012/0035016 A1 | 2/2012 | Miller |
| 2012/0043841 A1 | 2/2012 | Miller |
| 2012/0115667 A1 | 5/2012 | Lohr |
| 2012/0130603 A1 | 5/2012 | Simpson |
| 2012/0158229 A1 | 6/2012 | Schaefer |
| 2012/0238386 A1 | 9/2012 | Pohl |
| 2012/0239235 A1 | 9/2012 | Voigtlaender |
| 2012/0258839 A1 | 10/2012 | Smithson |
| 2012/0309579 A1 | 12/2012 | Miller |
| 2013/0035200 A1 | 2/2013 | Noji |
| 2013/0053211 A1 | 2/2013 | Fukuda |
| 2013/0072340 A1 | 3/2013 | Bazyn |
| 2013/0079191 A1 | 3/2013 | Lohr |
| 2013/0080006 A1 | 3/2013 | Vasiliotis |
| 2013/0095977 A1 | 4/2013 | Smithson |
| 2013/0102434 A1 | 4/2013 | Nichols |
| 2013/0106258 A1 | 5/2013 | Miller |
| 2013/0139531 A1 | 6/2013 | Pohl |
| 2013/0146406 A1 | 6/2013 | Nichols |
| 2013/0152715 A1 | 6/2013 | Pohl |
| 2013/0190123 A1 | 7/2013 | Pohl |
| 2013/0190125 A1 | 7/2013 | Nichols |
| 2013/0288844 A1 | 10/2013 | Thomassy |
| 2013/0288848 A1 | 10/2013 | Carter |
| 2013/0310214 A1 | 11/2013 | Pohl |
| 2013/0324344 A1 | 12/2013 | Pohl |
| 2013/0331218 A1 | 12/2013 | Lohr |
| 2013/0337971 A1 | 12/2013 | Kolstrup |
| 2014/0011619 A1 | 1/2014 | Pohl |
| 2014/0011628 A1 | 1/2014 | Lohr |
| 2014/0038771 A1 | 2/2014 | Miller |
| 2014/0073470 A1 | 3/2014 | Carter |
| 2014/0094339 A1 | 4/2014 | Ogawa |
| 2014/0121922 A1 | 5/2014 | Vasiliotis |
| 2014/0128195 A1 | 5/2014 | Miller |
| 2014/0141919 A1 | 5/2014 | Bazyn |
| 2014/0144260 A1 | 5/2014 | Nichols |
| 2014/0148303 A1 | 5/2014 | Nichols |
| 2014/0155220 A1 | 6/2014 | Messier |
| 2014/0179479 A1 | 6/2014 | Nichols |
| 2014/0206499 A1 | 7/2014 | Lohr |
| 2014/0228163 A1 | 8/2014 | Aratsu |
| 2014/0248988 A1 | 9/2014 | Lohr |
| 2014/0257650 A1 | 9/2014 | Carter |
| 2014/0274536 A1 | 9/2014 | Versteyhe |
| 2014/0323260 A1 | 10/2014 | Miller |
| 2014/0329637 A1 | 11/2014 | Thomassy |
| 2014/0335991 A1 | 11/2014 | Lohr |
| 2014/0365059 A1 | 12/2014 | Keilers |
| 2015/0018154 A1 | 1/2015 | Thomassy |
| 2015/0038285 A1 | 2/2015 | Aratsu |
| 2015/0039195 A1 | 2/2015 | Pohl |
| 2015/0051801 A1 | 2/2015 | Quinn, Jr. |
| 2015/0072827 A1 | 3/2015 | Lohr |
| 2015/0080165 A1 | 3/2015 | Pohl |
| 2015/0219194 A1 | 8/2015 | Winter |
| 2015/0226323 A1 | 8/2015 | Pohl |
| 2015/0233473 A1 | 8/2015 | Miller |
| 2015/0260284 A1 | 9/2015 | Miller |
| 2015/0337928 A1 | 11/2015 | Smithson |
| 2015/0345599 A1 | 12/2015 | Ogawa |
| 2015/0360747 A1 | 12/2015 | Baumgaertner |
| 2015/0369348 A1 | 12/2015 | Nichols |
| 2015/0377305 A1 | 12/2015 | Nichols |
| 2016/0003349 A1 | 1/2016 | Kimura |
| 2016/0031526 A1 | 2/2016 | Watarai |
| 2016/0039496 A1 | 2/2016 | Hancock |
| 2016/0040763 A1 | 2/2016 | Nichols |
| 2016/0061301 A1 | 3/2016 | Bazyn |
| 2016/0075175 A1 | 3/2016 | Biderman |
| 2016/0131231 A1 | 5/2016 | Carter |
| 2016/0146342 A1 | 5/2016 | Vasiliotis |
| 2016/0178037 A1 | 6/2016 | Pohl |
| 2016/0186847 A1 | 6/2016 | Nichols |
| 2016/0195177 A1 | 7/2016 | Versteyhe |
| 2016/0201772 A1 | 7/2016 | Lohr |
| 2016/0244063 A1 | 8/2016 | Carter |
| 2016/0273627 A1 | 9/2016 | Miller |
| 2016/0281825 A1 | 9/2016 | Lohr |
| 2016/0290451 A1 | 10/2016 | Lohr |
| 2016/0298740 A1 | 10/2016 | Carter |
| 2016/0347411 A1* | 12/2016 | Yamamoto ............. B62M 25/08 |
| 2016/0362108 A1 | 12/2016 | Keilers |
| 2016/0377153 A1 | 12/2016 | Ajumobi |
| 2017/0072782 A1 | 3/2017 | Miller |
| 2017/0082049 A1 | 3/2017 | David |
| 2017/0102053 A1 | 4/2017 | Nichols |
| 2017/0103053 A1 | 4/2017 | Guerra |
| 2017/0106866 A1* | 4/2017 | Schieffelin ............. B60W 10/11 |
| 2017/0159812 A1 | 6/2017 | Pohl |
| 2017/0163138 A1 | 6/2017 | Pohl |
| 2017/0204948 A1 | 7/2017 | Thomassy |
| 2017/0204969 A1 | 7/2017 | Thomassy |
| 2017/0211696 A1 | 7/2017 | Nassouri |
| 2017/0211698 A1 | 7/2017 | Lohr |
| 2017/0225742 A1 | 8/2017 | Hancock |
| 2017/0268638 A1 | 9/2017 | Nichols |
| 2017/0274903 A1 | 9/2017 | Carter |
| 2017/0276217 A1 | 9/2017 | Nichols |
| 2017/0284519 A1 | 10/2017 | Kolstrup |
| 2017/0284520 A1 | 10/2017 | Lohr |
| 2017/0314655 A1 | 11/2017 | Miller |
| 2017/0328470 A1 | 11/2017 | Pohl |
| 2017/0335961 A1 | 11/2017 | Hamrin |
| 2017/0343105 A1 | 11/2017 | Vasiliotis |
| 2017/0364995 A1* | 12/2017 | Yan ..................... H02J 7/0042 |
| 2018/0036593 A1 | 2/2018 | Ridgel |
| 2018/0066754 A1 | 3/2018 | Miller |
| 2018/0106359 A1 | 4/2018 | Kawakami |
| 2018/0119786 A1 | 5/2018 | Mepham |
| 2018/0134750 A1 | 5/2018 | Alkan |
| 2018/0148055 A1 | 5/2018 | Carter |
| 2018/0148056 A1 | 5/2018 | Keilers |
| 2018/0195586 A1 | 7/2018 | Thomassy |
| 2018/0202527 A1 | 7/2018 | Nichols |
| 2018/0221714 A1 | 8/2018 | Anderson |
| 2018/0236867 A1 | 8/2018 | Miller |
| 2018/0251190 A1 | 9/2018 | Hancock |
| 2018/0306283 A1 | 10/2018 | Engesather |
| 2018/0327060 A1 | 11/2018 | De Jager |
| 2018/0347693 A1 | 12/2018 | Thomassy |

(56) References Cited

U.S. PATENT DOCUMENTS

| | | |
|---|---|---|
| 2018/0372192 A1 | 12/2018 | Lohr |
| 2019/0049004 A1 | 2/2019 | Quinn, Jr. |
| 2019/0102858 A1* | 4/2019 | Pivnick .............. G06Q 30/0261 |
| 2019/0195321 A1 | 6/2019 | Smithson |
| 2019/0277399 A1 | 9/2019 | Guerin |
| 2019/0323582 A1 | 10/2019 | Horak |
| 2020/0018384 A1 | 1/2020 | Nichols |

FOREIGN PATENT DOCUMENTS

| | | |
|---|---|---|
| CN | 1054340 | 9/1991 |
| CN | 2245830 Y | 1/1997 |
| CN | 1157379 | 8/1997 |
| CN | 1167221 | 12/1997 |
| CN | 1178573 | 4/1998 |
| CN | 1178751 | 4/1998 |
| CN | 1204991 | 1/1999 |
| CN | 2320843 Y | 5/1999 |
| CN | 1281540 | 1/2001 |
| CN | 1283258 | 2/2001 |
| CN | 1297404 | 5/2001 |
| CN | 1300355 | 6/2001 |
| CN | 1412033 | 4/2003 |
| CN | 1434229 | 8/2003 |
| CN | 1474917 | 2/2004 |
| CN | 1483235 | 3/2004 |
| CN | 1555466 | 12/2004 |
| CN | 1568407 | 1/2005 |
| CN | 1654858 | 8/2005 |
| CN | 2714896 Y | 8/2005 |
| CN | 1736791 | 2/2006 |
| CN | 1791731 | 6/2006 |
| CN | 1847702 | 10/2006 |
| CN | 1860315 | 11/2006 |
| CN | 1896562 | 1/2007 |
| CN | 1940348 | 4/2007 |
| CN | 101016076 | 8/2007 |
| CN | 101166922 | 4/2008 |
| CN | 101312867 | 11/2008 |
| CN | 201777370 U | 3/2011 |
| CN | 102165219 | 8/2011 |
| CN | 102287530 | 12/2011 |
| CN | 102947626 A | 2/2013 |
| CN | 203358799 U | 12/2013 |
| CN | 103857576 A | 6/2014 |
| CN | 104648595 A | 5/2015 |
| CN | 104854380 A | 8/2015 |
| CN | 108501935 | 9/2018 |
| DE | 498701 | 5/1930 |
| DE | 866748 C | 2/1953 |
| DE | 1165372 B | 3/1964 |
| DE | 1171692 | 6/1964 |
| DE | 2021027 | 12/1970 |
| DE | 2136243 | 2/1972 |
| DE | 2310880 | 9/1974 |
| DE | 2436496 | 2/1975 |
| DE | 3940919 | 6/1991 |
| DE | 4120540 C1 | 11/1992 |
| DE | 19851738 | 5/2000 |
| DE | 10155372 | 5/2003 |
| DE | 10261372 | 7/2003 |
| DE | 102009016869 | 10/2010 |
| DE | 102011016672 | 10/2012 |
| DE | 102012107360 | 2/2013 |
| DE | 102012107927 | 2/2013 |
| DE | 102012210842 | 1/2014 |
| DE | 102012212526 | 1/2014 |
| DE | 102012023551 | 6/2014 |
| DE | 102012222087 | 6/2014 |
| DE | 102013201101 | 7/2014 |
| DE | 102014007271 | 12/2014 |
| DE | 102013214169 | 1/2015 |
| DE | 102019121883 | 9/2020 |
| EP | 0432742 | 6/1991 |
| EP | 0528381 | 2/1993 |
| EP | 0528382 | 2/1993 |
| EP | 0635639 | 1/1995 |
| EP | 0638741 | 2/1995 |
| EP | 0831249 | 3/1998 |
| EP | 0832816 | 4/1998 |
| EP | 0877341 | 11/1998 |
| EP | 0976956 | 2/2000 |
| EP | 1010612 | 6/2000 |
| EP | 1136724 | 9/2001 |
| EP | 1188602 | 3/2002 |
| EP | 1251294 | 10/2002 |
| EP | 1362783 | 11/2003 |
| EP | 1366978 | 12/2003 |
| EP | 1433641 | 6/2004 |
| EP | 1452441 | 9/2004 |
| EP | 1518785 | 3/2005 |
| EP | 1624230 | 2/2006 |
| EP | 1811202 | 7/2007 |
| EP | 1850038 | 10/2007 |
| EP | 2261108 | 12/2010 |
| EP | 2338782 | 6/2011 |
| EP | 2464560 | 6/2012 |
| EP | 2602672 A1 | 6/2013 |
| EP | 2620672 | 7/2013 |
| EP | 2357128 | 8/2014 |
| EP | 2893219 | 7/2015 |
| EP | 2927534 | 10/2015 |
| FR | 620375 | 4/1927 |
| FR | 2460427 | 1/1981 |
| FR | 2590638 | 5/1987 |
| FR | 2909938 | 6/2008 |
| FR | 2996276 | 4/2014 |
| FR | 3073479 | 5/2019 |
| GB | 391448 | 4/1933 |
| GB | 592320 | 9/1947 |
| GB | 772749 A | 4/1957 |
| GB | 858710 | 1/1961 |
| GB | 906002 A | 9/1962 |
| GB | 919430 A | 2/1963 |
| GB | 1132473 | 11/1968 |
| GB | 1165545 | 10/1969 |
| GB | 1376057 | 12/1974 |
| GB | 2031822 | 4/1980 |
| GB | 2035481 | 6/1980 |
| GB | 2035482 | 6/1980 |
| GB | 2080452 | 2/1982 |
| JP | 38025315 | 11/1963 |
| JP | 413126 | 2/1966 |
| JP | 0422844 | 2/1967 |
| JP | 441098 | 1/1969 |
| JP | 46029087 B | 8/1971 |
| JP | 47448 B | 1/1972 |
| JP | 47962 B | 1/1972 |
| JP | 47207 | 6/1972 |
| JP | 4720535 | 6/1972 |
| JP | 47001621 | 8/1972 |
| JP | 4700962 | 11/1972 |
| JP | 4729762 | 11/1972 |
| JP | 4854371 | 7/1973 |
| JP | 4912742 | 3/1974 |
| JP | 49012742 | 3/1974 |
| JP | 49013823 | 4/1974 |
| JP | 49041536 | 11/1974 |
| JP | 50114581 | 9/1975 |
| JP | 5125903 | 8/1976 |
| JP | 51150380 | 12/1976 |
| JP | 5235481 | 3/1977 |
| JP | 53048166 | 1/1978 |
| JP | 5350395 U1 | 4/1978 |
| JP | 55135259 | 10/1980 |
| JP | 5624251 | 3/1981 |
| JP | 56047231 | 4/1981 |
| JP | 56101448 | 8/1981 |
| JP | 56127852 | 10/1981 |
| JP | 58065361 | 4/1983 |
| JP | 59069565 | 4/1984 |
| JP | 59144826 | 8/1984 |
| JP | 59190557 | 10/1984 |
| JP | 6073958 U | 5/1985 |

(56) References Cited

FOREIGN PATENT DOCUMENTS

| | | |
|---|---|---|
| JP | 60247011 | 12/1985 |
| JP | 61031754 | 2/1986 |
| JP | 61053423 | 3/1986 |
| JP | 61173722 | 10/1986 |
| JP | 61270552 | 11/1986 |
| JP | 62075170 | 4/1987 |
| JP | 63125854 | 5/1988 |
| JP | 63219953 | 9/1988 |
| JP | 63160465 | 10/1988 |
| JP | 01210653 | 8/1989 |
| JP | 01039865 | 11/1989 |
| JP | 01286750 | 11/1989 |
| JP | 01308142 | 12/1989 |
| JP | 02130224 | 5/1990 |
| JP | 02157483 | 6/1990 |
| JP | 02271142 | 6/1990 |
| JP | 02182593 | 7/1990 |
| JP | 03149442 | 6/1991 |
| JP | 03223555 | 10/1991 |
| JP | 422843 B | 1/1992 |
| JP | 470207 | 3/1992 |
| JP | 470962 | 3/1992 |
| JP | 479762 | 3/1992 |
| JP | 04166619 | 6/1992 |
| JP | 04272553 | 9/1992 |
| JP | 04327055 | 11/1992 |
| JP | 04351361 | 12/1992 |
| JP | 05087154 | 4/1993 |
| JP | 0650358 | 2/1994 |
| JP | 06050169 | 2/1994 |
| JP | 07042799 | 2/1995 |
| JP | 07133857 | 5/1995 |
| JP | 07139600 | 5/1995 |
| JP | 07259950 | 10/1995 |
| JP | 08135748 | 5/1996 |
| JP | 08170706 A | 7/1996 |
| JP | 08247245 | 9/1996 |
| JP | 08270772 | 10/1996 |
| JP | 09024743 A | 1/1997 |
| JP | 09089064 | 3/1997 |
| JP | 1078094 | 3/1998 |
| JP | 10061739 | 3/1998 |
| JP | 10089435 | 4/1998 |
| JP | 10115355 | 5/1998 |
| JP | 10115356 | 5/1998 |
| JP | 10194186 | 7/1998 |
| JP | 10225053 | 8/1998 |
| JP | 10511621 | 11/1998 |
| JP | H10307964 | 11/1998 |
| JP | 11063130 A | 3/1999 |
| JP | 11091411 | 4/1999 |
| JP | 11210850 | 8/1999 |
| JP | 11227669 | 8/1999 |
| JP | 11240481 | 9/1999 |
| JP | 11257479 | 9/1999 |
| JP | 11317653 | 11/1999 |
| JP | 2000006877 | 1/2000 |
| JP | 2000046135 | 2/2000 |
| JP | 2000177673 | 6/2000 |
| JP | 2001027298 | 1/2001 |
| JP | 2001071986 | 3/2001 |
| JP | 2001107827 | 4/2001 |
| JP | 2001165296 | 6/2001 |
| JP | 2001234999 | 8/2001 |
| JP | 2001328466 | 11/2001 |
| JP | 2001521109 | 11/2001 |
| JP | 2002147558 | 5/2002 |
| JP | 61144466 | 9/2002 |
| JP | 2002250421 | 9/2002 |
| JP | 2002291272 | 10/2002 |
| JP | 2002307956 | 10/2002 |
| JP | 2002533626 | 10/2002 |
| JP | 2002372114 | 12/2002 |
| JP | 2003028257 | 1/2003 |
| JP | 2003056662 | 2/2003 |
| JP | 2003507261 | 2/2003 |
| JP | 2003161357 | 6/2003 |
| JP | 2003194206 | 7/2003 |
| JP | 2003194207 | 7/2003 |
| JP | 2003524119 | 8/2003 |
| JP | 2003320987 | 11/2003 |
| JP | 2003336732 | 11/2003 |
| JP | 2004011834 | 1/2004 |
| JP | 2004038722 | 2/2004 |
| JP | 2004162652 | 6/2004 |
| JP | 2004189222 | 7/2004 |
| JP | 2004232776 | 8/2004 |
| JP | 2004526917 | 9/2004 |
| JP | 2004301251 | 10/2004 |
| JP | 2005003063 | 1/2005 |
| JP | 2005096537 | 4/2005 |
| JP | 2005188694 | 7/2005 |
| JP | 2005240928 | 9/2005 |
| JP | 2005312121 | 11/2005 |
| JP | 2006015025 | 1/2006 |
| JP | 2006283900 | 10/2006 |
| JP | 2006300241 | 11/2006 |
| JP | 2007085404 | 4/2007 |
| JP | 2007321931 | 12/2007 |
| JP | 2007535715 | 12/2007 |
| JP | 2008002687 | 1/2008 |
| JP | 2008014412 | 1/2008 |
| JP | 2008133896 | 6/2008 |
| JP | 4351361 | 10/2009 |
| JP | 2010069005 | 4/2010 |
| JP | 2010532454 | 10/2010 |
| JP | 2011178341 | 9/2011 |
| JP | 2012501418 | 1/2012 |
| JP | 2012506001 | 3/2012 |
| JP | 4913823 | 4/2012 |
| JP | 4941536 | 5/2012 |
| JP | 2012107725 | 6/2012 |
| JP | 2012121338 | 6/2012 |
| JP | 2012122568 | 6/2012 |
| JP | 2012211610 | 11/2012 |
| JP | 2012225390 | 11/2012 |
| JP | 2013521452 | 6/2013 |
| JP | 2013147245 | 8/2013 |
| JP | 5348166 | 11/2013 |
| JP | 5647231 | 12/2014 |
| JP | 5668205 | 2/2015 |
| JP | 2015505022 | 2/2015 |
| JP | 2015075148 | 4/2015 |
| JP | 2015227690 | 12/2015 |
| JP | 2015227691 | 12/2015 |
| JP | 5865361 | 2/2016 |
| JP | 5969565 | 8/2016 |
| JP | 6131754 | 5/2017 |
| JP | 6153423 | 6/2017 |
| JP | 6275170 | 2/2018 |
| JP | 2018025315 | 2/2018 |
| KR | 20020054126 | 7/2002 |
| KR | 20020071699 | 9/2002 |
| KR | 20080079274 | 8/2008 |
| KR | 20080081030 | 9/2008 |
| KR | 20130018976 | 2/2013 |
| KR | 101339282 | 1/2014 |
| NL | 98467 C | 7/1961 |
| TW | 74007 | 1/1984 |
| TW | 175100 | 12/1991 |
| TW | 218909 B | 1/1994 |
| TW | 227206 | 7/1994 |
| TW | 275872 | 5/1996 |
| TW | 294598 U | 1/1997 |
| TW | 360184 B | 6/1999 |
| TW | 366396 B | 8/1999 |
| TW | 401496 B | 8/2000 |
| TW | 510867 B | 11/2002 |
| TW | 512211 B | 12/2002 |
| TW | 582363 B | 4/2004 |
| TW | 590955 B | 6/2004 |
| TW | 225129 B | 12/2004 |
| TW | 225912 B | 1/2005 |
| TW | 235214 B | 7/2005 |

(56) References Cited

FOREIGN PATENT DOCUMENTS

| | | |
|---|---|---|
| TW | 200637745 | 11/2006 |
| TW | 200741116 | 11/2007 |
| TW | 200821218 | 5/2008 |
| TW | 201339049 | 10/2013 |
| WO | 9908024 | 2/1999 |
| WO | 9920918 | 4/1999 |
| WO | 2000061388 | 10/2000 |
| WO | 0138758 | 5/2001 |
| WO | 2001073319 | 10/2001 |
| WO | 2002088573 | 11/2002 |
| WO | 2003086849 | 10/2003 |
| WO | 2003100294 | 12/2003 |
| WO | 2004079223 | 9/2004 |
| WO | 2005019669 | 3/2005 |
| WO | 2005083305 | 9/2005 |
| WO | 2005108825 | 11/2005 |
| WO | 2005111472 | 11/2005 |
| WO | 2006014617 | 2/2006 |
| WO | 2006047887 | 5/2006 |
| WO | 2006091503 | 8/2006 |
| WO | 2007061993 | 5/2007 |
| WO | 2007070167 | 6/2007 |
| WO | 2007077502 | 7/2007 |
| WO | 2008002457 | 1/2008 |
| WO | 2008057507 | 5/2008 |
| WO | 2008078047 | 7/2008 |
| WO | 2008095116 | 8/2008 |
| WO | 2008100792 | 8/2008 |
| WO | 2008101070 | 8/2008 |
| WO | 2008131353 | 10/2008 |
| WO | 2008154437 | 12/2008 |
| WO | 2009006481 | 1/2009 |
| WO | 2009148461 | 12/2009 |
| WO | 2009157920 | 12/2009 |
| WO | 2010017242 | 2/2010 |
| WO | 2010024809 | 3/2010 |
| WO | 2010044778 | 4/2010 |
| WO | 2010073036 | 7/2010 |
| WO | 2010094515 | 8/2010 |
| WO | 2010135407 | 11/2010 |
| WO | 2011064572 | 6/2011 |
| WO | 2011101991 | 8/2011 |
| WO | 2011109444 | 9/2011 |
| WO | 2011121743 | 10/2011 |
| WO | 2011124415 | 10/2011 |
| WO | 2011138175 | 11/2011 |
| WO | 2012030213 | 3/2012 |
| WO | 2013042226 | 3/2013 |
| WO | 2013112408 | 8/2013 |
| WO | 2014186732 | 11/2014 |
| WO | 2016022553 | 2/2016 |
| WO | 2016062461 | 4/2016 |
| WO | 2016079620 | 5/2016 |
| WO | 2017056541 | 4/2017 |
| WO | 2017186911 | 11/2017 |

OTHER PUBLICATIONS

Examination report dated Jul. 11, 2018 in Indian Patent Application No. 2060/KOLNP/2010.
International Search Report and Written Opinion dated Apr. 16, 2008, for PCT Application No. PCT/US2007/023315 (LINEARB.047VPC).
International Search Report and Written Opinion dated Feb. 2, 2010 from International Patent Application No. PCT/US2008/068929, filed on Jan. 7, 2008. (LINEARB.054VPC).
International Search Report and Written Opinion dated Jan. 25, 2010 from International Patent Application No. PCT/US2009/052761, filed on Aug. 4, 2009.
International Search Report and Written Opinion dated Jul. 21, 2017 in PCT/US2017/032023 (LINEARB.11 0WO).
International Search Report and Written Opinion dated Jun. 27, 2017 in PCT/US2016/063880 (LINEARB.106WO).
International Search Report and Written Opinion dated Nov. 13, 2009 from International Patent Application No. PCT/US2008/053951, filed on Feb. 14, 2008.
International Search Report for International Application No. PCT/US2007/023315 dated Apr. 16, 2008.
International Search Report for International Application No. PCT/US2006/039166 dated Feb. 27, 2007.
Notification of Reasons for Rejection dated Oct. 6, 2020 in Japanese Patent Application No. 2018-536480, 21 pages (LINEARB.106JP).
Notification of the First Office Action dated Jun. 26, 2019 in Chinese Patent Application No. 201680080281.3 (LINEARB.106CN).
Notification of the Second Office Action dated Mar. 16, 2020 in Chinese Patent Application No. 201680080281.3, 15 pages (LINEARB.106CN).
Office Action dated Apr. 2, 2014 in U.S. Appl. No. 13/288,711.
Office Action dated Aug. 29, 2013 in U.S. Appl. No. 13/288,711.
Office Action dated Aug. 3, 2015 in U.S. Appl. No. 14/541,875.
Office Action dated Dec. 12, 2011 for U.S. Appl. No. 12/271,611.
Office Action dated Dec. 12, 2011 for U.S. Appl. No. 12/271,611 (LINEARB.073A).
Office Action dated Dec. 12, 2016 in U.S. Appl. No. 13/938,056 (LINEARB.056C1).
Office Action dated Dec. 29, 2017 in U.S. Appl. No. 14/839,567 (LINEARB.037C5).
Office Action dated Jan. 18, 2017 in U.S. Appl. No. 14/529,773 (LINEARB.073DI).
Office Action dated Jan. 20, 2012 for U.S. Appl. No. 12/137,456. (LINEARB.037C1 ).
Office Action dated Jan. 20, 2015 in U.S. Appl. No. 13/682,176 (LINEARB.037C4).
Office Action dated Jul. 16, 2012 for U.S. Appl. No. 12/271,611 (LINEARB.073A).
Office Action dated Jul. 18, 2016 in U.S. Appl. No. 13/938,056 (LINEARB.056C1).
Office Action dated Jul. 5, 2017 in U.S. Appl. No. 14/529,773 (LINEARB.073DI).
Office Action dated Jul. 6, 2016 in U.S. Appl. No. 14/529,773 (LINEARB.073DI).
Office Action dated Jun. 19, 2014 in U.S. Appl. No. 13/682,176 (LINEARB.037C4).
Office Action dated Jun. 8, 2018 in U.S. Appl. No. 14/839,567 (LINEARB.037C5).
Office Action dated Mar. 14, 2012 for U.S. Appl. No. 12/137,480 (LINEARB.037C3).
Office Action dated Mar. 18, 2010 from U.S. Appl. No. 12/137,464 (LINEARB.037C2).
Office Action dated Mar. 5, 2015 in U.S. Appl. No. 14/541,875.
Office Action dated May 17, 2012 for U.S. Appl. No. 12/159,688 (LINEARB.056NP).
Office Action dated Nov. 14, 2012 for U.S. Appl. No. 12/159,688 (LINEARB.056NP).
Office Action dated Nov. 14, 2017 in U.S. Appl. No. 15/172,031, 5 pages (LINEARB.11 0A).
Office Action dated Nov. 3, 2017 in U.S. Appl. No. 14/996,743, 10 pages (LINEARB.106A).
Office Action dated Sep. 15, 2010 for U.S. Appl. No. 11/543,311 (LINEARB.037A).
Thomassy, Fernand A., "An Engineering Approach to Simulating Traction EHL", CVT-Hybrid International Conference Mecc/Maastricht/The Netherlands, Nov. 17-19, 2010, p. 97.

* cited by examiner

SYSTEMS AND METHODS FOR AUTOMATIC CONFIGURATION AND AUTOMATIC CALIBRATION OF CONTINUOUSLY VARIABLE TRANSMISSIONS AND BICYCLES HAVING CONTINUOUSLY VARIABLE TRANSMISSION

CROSS-REFERENCE TO RELATED APPLICATIONS

This application is a divisional of U.S. patent application Ser. No. 16/034,659, filed Jul. 13, 2018 and scheduled to issue on Dec. 29, 2020 as U.S. Pat. No. 10,875,603, which is a continuation of U.S. patent application Ser. No. 15/172,031, filed Jun. 2, 2016 and issued as U.S. Pat. No. 10,023,266 on Jul. 17, 2018, which claims priority under 35 U.S.C. § 119(e) to U.S. Provisional Patent Application No. 62/334,947, filed May 11, 2016, and to U.S. Provisional Patent Application No. 62/344,325, filed Jun. 1, 2016. The disclosures of all of the above-referenced prior applications, publications, and patents are considered part of the disclosure of this application, and are incorporated by reference herein in their entirety.

Continuously variable transmissions (CVTs) are being used ever more increasingly in systems in which shift shock, gear collisions, and other mechanical events are known to occur. In particular, continuously variable transmissions are gaining popularity for cyclists because they provide a continuous range of transmission ratios, are easy to use, require little or no maintenance, and have increased reliability over geared transmissions.

In ball planetary type CVTs, power may be transferred between components via a traction fluid. The use of a traction fluid avoids issues with geared transmissions. In particular, CVTs such as those described in U.S. Pat. Nos. 7,011,600, 7,238,136, 7,198,585, 7,250,018, 7,166,056, 7,235,031, 7,169,076, 7,288,042, 7,396,209, 8,066,614, 7,731,615, 7,651,437, 7,727,108, 7,686,729, 8,267,829, 7,238,137, 7,036,620, 7,238,138, 7,232,395, 7,125,297, 8,469,853, 8,628,443 and 7,322,901 provide smooth acceleration and deceleration by eliminating the undesirable mechanical events associated with geared transmissions.

Some CVTs may employ electronic mechanisms for automatically adjusting the transmission ratio. To improve the performance and accuracy of these mechanisms, configuration and calibration may be performed at setup, at selected intervals, when a component is replaced, etc. Presently, configuration information is entered manually, and calibration may be performed on an ad hoc basis, such as when manually initiated by a user of a bicycle.

The steps needed to configure a bicycle may seem relatively easy. For example, experienced cyclists are generally aware that the number of teeth on a front gear is usually stamped onto the gear itself. Furthermore, experienced cyclists may know the number of teeth on a gear based on their experience of handling gears, interacting with the gear manufacturer, or by previous trial and error. However, for people not familiar with the different components on a bicycle, this process is prone to errors and frustration. For example, even if the number of teeth is stamped on a gear, a person with little or no experience with bicycles might not know to look for a number stamped on the gear or might not know where to find it. Or, the user might manually count the number of teeth. This can be frustrating, the user might not be physically able to perform the task, and errors can occur. Furthermore, if the person makes a mistake and enters the wrong number, the person might not know there is an error or might not know how to correct the error.

SUMMARY

Embodiments disclosed herein may be integrated with an automatic ratio adjusting system or may otherwise extend the functionality of an automatic ratio adjusting system. The ratio adjusting system may be used to change the transmission ratio over a range of transmission ratios. Systems and methods disclosed herein may ensure the entire range is available.

Systems disclosed herein may be communicatively coupled via a controller area network (CAN). Communicative coupling may involve a wireless or wired connection, and may involve continuous communication or discontinuous communication for the purpose of sending and receiving information from any of several components.

In one broad respect, an auto-configuration system may include a controller area network (CAN) with a system controller communicatively coupled to sensors and a CVT controller. At start up, the system controller sends a mutually pre-defined packet over the CAN bus to the CVT controller which stores information about components.

In another broad respect, embodiments disclosed herein may be directed to a system and method for determining a physical configuration of a bicycle and for determining an operational configuration of the bicycle. A user aligns components of the bicycle within a virtual overlay depicted on a screen. A picture of the rear gear is used to determine the number of rear gear teeth, the rear gear size, and other rear gear information. A picture of the rear wheel is used to determine the rear wheel diameter and the relationship in size between the rear wheel and the rear gear. A picture of the front gear is used to determine the number of front gear teeth and the front gear size. A picture of the entire bicycle is used to determine physical properties of the bicycle, the chain length, and other metric information, which is used to determine operational parameters of the bicycle.

Calibration may use an adaptive algorithm, including identifying a polynomial or other equation, and using empirical data. A first polynomial may characterize the performance of a CVT under a first load, and a second polynomial may characterize the performance of a CVT under a second load. In other settings, a single polynomial may characterize the performance of a CVT and values for different variables within the polynomial may be changed to characterize the performance of the CVT under different loads.

In one embodiment, a system for automatic calibration of a bicycle includes a first controller having a first processor and a first memory storing a first set of instructions executable by the first processor and adapted to: initiate a camera function; determine if a first image of a first component of the bicycle exists; if an image of the first component of the bicycle exists, determine a physical characteristic of the first component. The system also includes a second set of instructions adapted to control one or more of a continuously variable transmission and an electric motor based on the physical characteristic of the first component. The first component can include a gear. The system can include an overlay on a display coupled to the first processor adapted to aid a user in determining if the first image of the first component is correlated with the overlay. In some embodiments, the first controller is part of a smart phone, a personal data assistant, or a tablet. The system can include a second controller having a second processor and a second memory, wherein the second set of instructions is at least in part stored on the second memory and executed by the second processor. The first controller can be a portable computing device. The second controller can be coupled to the bicycle. The first controller can be further adapted to: determine if a second image of a second component of the bicycle exists; and determine a physical characteristic of the second component, wherein the second processor is adapted to control one or more of the continuously variable transmission and the electric motor based on one or more of the physical characteristic of the first component and the physical characteristic of the second component. In one embodiment, the first component is a first gear and the second component is a second gear, and the first set of instructions are executable to determine a gear ratio based on the first gear and the second gear. In another embodiment, the first component is a first gear and the second component is a second gear, and the second set of instructions are executable to determine a gear ratio based on the first gear and the second gear. In a further embodiment, the first component is a first gear and the second component is a wheel, and the first set of instructions are executable to determine a motor speed based on the first gear and the wheel.

A system for automatic calibration of a bicycle is provided. The system includes a first computer adapted to determine a first set of operating parameters of the bicycle, and communicate the first set of operating parameters to a second computer. The second computer has a set of instructions to: determine a first characteristic of a first component; and control a continuously variable transmission based on the first component and the first set of operating parameters. In one embodiment, the first set of operating parameters are associated with a road bicycle. Control of the continuously variable transmission based on the first component and the first set of operating parameters includes optimizing the continuously variable transmission for a rider on substantially paved roads. In another embodiment, the system includes an electric motor and the first set of operating parameters are associated with a road bicycle. Control of the continuously variable transmission based on the first component and the first set of operating parameters includes optimizing the continuously variable transmission and the electric motor for a rider on substantially paved roads. In a further embodiment, the first set of operating parameters are associated with a mountain bicycle, and control of the continuously variable transmission based on the first component and the first set of operating parameters includes optimizing the continuously variable transmission for a rider on unpaved routes. In still a further embodiment, the system includes an electric motor and the first set of operating parameters are associated with a mountain bicycle. Control of the continuously variable transmission based on the first component and the first set of operating parameters includes optimizing the continuously variable transmission and the electric motor for a rider on unpaved routes. In yet another embodiment, the first set of operating parameters are associated with a commercial bicycle, and control of the continuously variable transmission based on the first component and the first set of operating parameters includes optimizing the continuously variable transmission for a rider transporting heavy items. In yet a further embodiment, the system includes an electric motor, and the first set of operating parameters are associated with a commercial bicycle. Control of the continuously variable transmission based on the first component and the first set of operating parameters includes optimizing the continuously variable transmission and the electric motor for a rider transporting heavy items.

In some embodiments, determining the first characteristic of the first component includes determining one of a gear size, a gear tooth count, a wheel size, a chain length, a gear ratio, a frame size, a length of a frame member and a seat height.

A method for automatic calibration of a bicycle can include determining a frame size of the bicycle; determining a wheel size for the bicycle; determining a front gear size for the bicycle; determining a rear gear size for the bicycle; determining an operating range for a continuously variable transmission based on the frame size, wheel size, front gear size or rear gear size for the bicycle; and communicating a set of instructions for controlling a continuously variable transmission (CVT) based on the determined operating range. The wheel size can correspond to a mountain bike, and the set of instructions can be executable to control a CVT under mountain biking conditions. The set of instructions can be communicated to a continuously variable transmission controller. The set of instructions can be communicated to a bike controller. A first portion of the set of instructions can be communicated to a continuously variable transmission controller and a second portion of the set of instructions can be communicated to a CVT controller. The first portion of the set of instructions can consist of instructions for adjusting a continuously variable transmission. The first portion of the set of instructions can be for calculating a continuously variable transmission ratio. The first portion of the set of instructions can be for looking up a continuously variable transmission ratio in a data structure stored in memory. The first portion of the set of instructions can be for looking up a continuously variable transmission ratio in a table stored in memory. The second portion of the set of instructions can be instructions for adjusting a continuously variable transmission. The second portion of the set of instructions can be for calculating a continuously variable transmission ratio. The second portion of the set of instructions can be for looking up a continuously variable transmission ratio in a data structure stored in memory. The second portion of the set of instructions can be for looking up a continuously variable transmission ratio in a table stored in memory. The second portion of the set of instructions can further include instructions for controlling an electric motor.

A method for configuring a bicycle can include: communicating, at startup by a continuously variable transmission controller, a first packet of information to a bike controller, the packet of information containing one or more operating parameters for a continuously variable transmission; and communicating, at startup by a continuously variable transmission controller, a first packet of information to a bike controller, the packet of information containing one or more operating parameters for a continuously variable transmission.

A method for configuring a bicycle can include presenting a display via a graphical user interface (GUI); receiving, via the GUI, one or more user inputs; and operating the bicycle according to a set of parameters based on the one or more user inputs. At least one user input can correspond to a cadence. At least one user input can correspond to a gear ratio. At least one user input can correspond to a desired riding performance. At least one user input can correspond to a distance. At least one user input can correspond to a bicycle speed. At least one user input can correspond to a load. Operating the bicycle according to a set of parameters can include determining an algorithm for operating the bicycle. Operating the bicycle according to a set of parameters based on the one or more user inputs can include: operating the bicycle according to a first algorithm; determining a second algorithm based on the set of parameters; and replacing the first algorithm with the second algorithm. The set of parameters can include information about one or more components on the bicycle. The one or more components can include one or more of a continuously variable transmission, an electric motor, a rear gear, a front gear, a chain length, and a physical configuration of the bicycle. The method can further include communicating the second algorithm to a server. Operating the bicycle according to a set of parameters based on the one or more user inputs can include operating the bicycle according to a first algorithm; determining a second algorithm based on the one or more user inputs; and replacing the first algorithm with the second algorithm. The one or more user inputs comprises an operating mode or a target cadence.

A method for determining an operating range for a continuously variable transmission (CVT) on a bicycle can include determining a first ratio point from a first wheel speed; adjusting a continuously variable transmission ratio at a predetermined rate to a first physical limit; and calculating, based on a time needed to reach the first physical limit from the first ratio point, a second physical limit of the continuously variable transmission. The first physical limit can be full underdrive. The first physical limit can be full overdrive. Adjusting a continuously variable transmission ratio at a predetermined rate can include changing the tilt angle of a ball planetary type CVT at a predetermined rate. Adjusting a continuously variable transmission ratio at a predetermined rate can include changing a beta angle of a first stator relative to a second stator of a ball planetary type CVT at a predetermined rate. The predetermined rate can be linear. Determining a first ratio point can be based on an encoder position.

A method of controlling a continuously variable transmission (CVT) can include operating the CVT according to an open loop process under a first set of operating conditions; and operating the CVT according to a closed loop process under a second set of operating conditions. The first set of operating conditions can include low load conditions. The second set of operating conditions can include high load conditions. The second set of operating conditions can include high pedal rotational speed conditions. The second set of operating conditions can include high pedal rotational speed conditions in excess of 80 revolutions per minute. The second set of operating conditions can include high pedal rotational speed conditions in excess of 90 revolutions per minute. The second set of operating conditions can include high pedal rotational speed conditions in excess of 100 revolutions per minute. The second set of operating conditions can include high pedal rotational speed conditions in excess of 110 revolutions per minute.

A method of controlling a continuously variable transmission (CVT) can include operating the CVT according to a first polynomial under a first set of operating conditions; and operating the CVT according to a second polynomial under a second set of operating conditions. The first set of operating conditions can include low load conditions. The second set of operating conditions can include high load conditions. The second set of operating conditions can include high pedal rotational speed conditions. The second set of operating conditions can include high pedal rotational speed conditions in excess of 80 revolutions per minute. The second set of operating conditions can include high pedal rotational speed conditions in excess of 90 revolutions per minute. The second set of operating conditions can include high pedal rotational speed conditions in excess of 100 revolutions per minute. The second set of operating conditions can include high pedal rotational speed conditions in excess of 110 revolutions per minute.

A method of controlling a continuously variable transmission includes: during a ride, operating a continuously variable transmission according to a first algorithm; storing, by the controller in a memory, data for the bicycle over a predetermined time period, wherein the data includes a predicted distance associated with a rear wheel speed and a cadence in accordance with the first algorithm; if the rear wheel speed and the cadence remain substantially constant over the predetermined time period: determining the actual distance covered during the predetermined time period; and determining a second algorithm based on the actual distance covered; and operating the continuously variable transmission according to the second algorithm. Determining the actual distance covered can include comparing a first set of GPS coordinates from a beginning of a data set with a second set of GPS coordinates from an end of the data set. Determining the actual distance covered can include comparing the rear wheel speed over time to a set of GPS coordinates.

A method of configuring a controller for a continuously variable transmission on a bicycle can include the steps of: establishing a first configuration setting; monitoring a set of riding data to determine when a steady state speed is maintained for a specified period of time; recording said riding data until the earlier of a second specified period or until the riding data deviates by a predetermined amount from the steady state speed; identifying a control set of data by comparing a first set of GPS data at the beginning of the recorded data to a second set of GPS data at the end of the recorded data; comparing the recorded data against the control set of data to develop an error value; and establishing a second configuration setting for the controller based on the error value. The method can further include requesting and receiving an input of information from a user; and correlating the information received from the user with a set of stored data to establish the first configuration setting. The information that is provided in the input of information step can include one or more of the following: bicycle model, tire size, front chain ring teeth, rear cog teeth, bicycle size and serial number. The riding data can include one or more of wheel speed, pedal cadence, expected bicycle speed, bicycle position and continuously variable transmission ratio. The steps of monitoring, recording, identifying, comparing and establishing a second configuration setting can be repeated until the error value is within a specified tolerance. The controller can repeat the steps of monitoring, recording, identifying, comparing and establishing a second configuration setting periodically to monitor the configuration setting and ensure it remains within the specified tolerance. The period of time between monitoring the configuration setting can be no more than one month. The period of time between monitoring the configuration setting can be no more than one week. The process to monitor the configuration setting of the controller can occur every time the bicycle remains at a steady state, meaning speed and cadence are within the defined tolerance, for more than 30 seconds.

DETAILED DESCRIPTION

As defined herein, the term configuration refers to any process for ensuring a controller "knows" the system in which it is operating. Configuration may involve any process in which a controller is communicatively coupled to components and is able to communicate using a communication protocol or control scheme according to a control preference available to or preferred by a user. The system may include just the CVT, may include a drive train including the CVT, or may include a bicycle having a CVT or a bicycle having a drive train with a CVT. A drive train may include a chain, belt or other power transmitting element between one or more power sources and one or more power loads.

Steps in a configuration process may be performed at one or more levels in the production or assembly of a bicycle or the delivery of a bicycle to an end user. Although certain preferred embodiments may be described herein, it should be noted that an original equipment manufacturer (OEM) may perform part or all of a configuration process, a dealer or other entity in the sales chain may perform part or all of a configuration process, and an end user may perform part or all of a configuration process.

Figure 1:
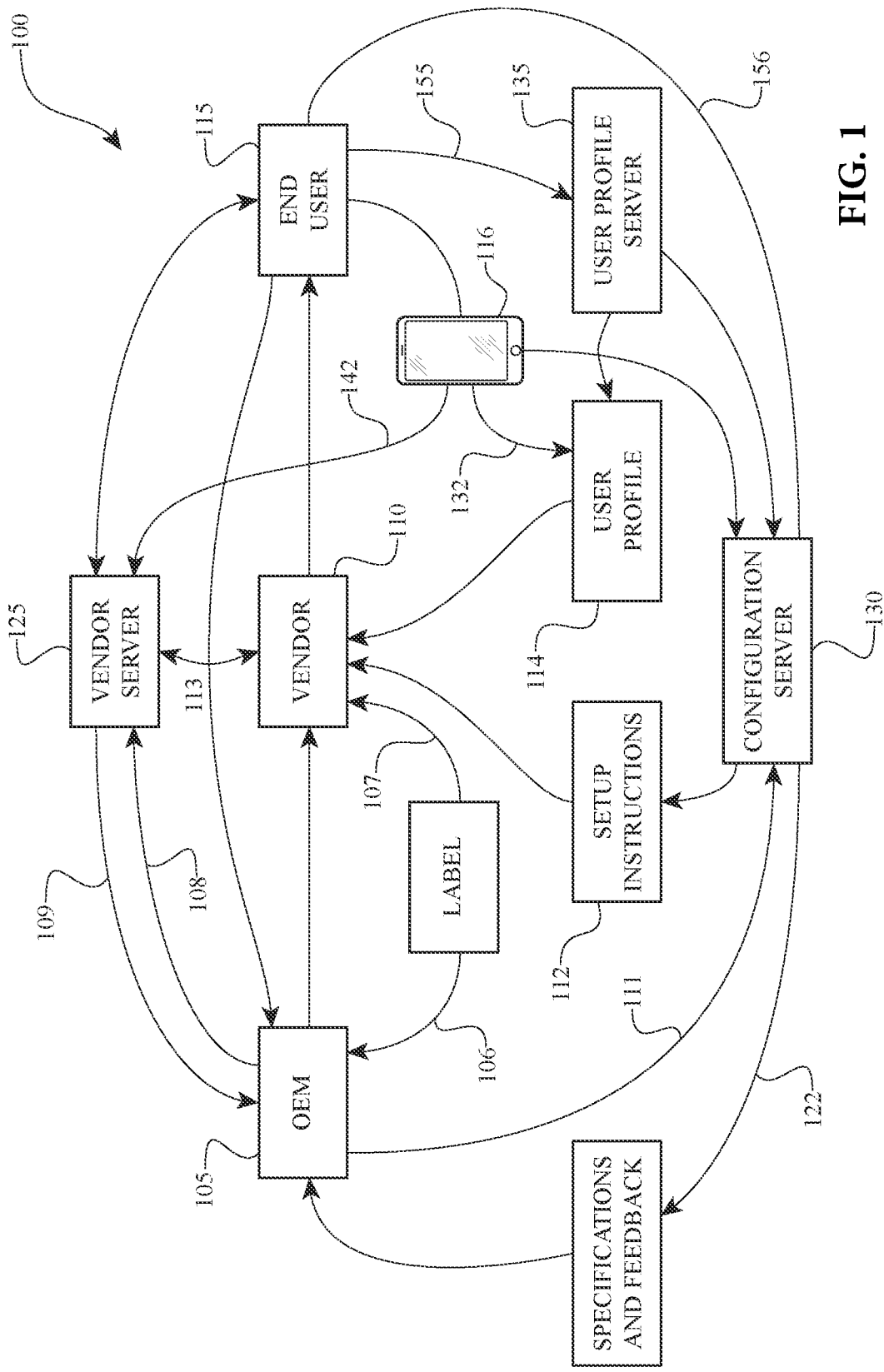
FIG. 1 is a schematic diagram of a bicycle configuration system, illustrating variations and steps in a bicycle configuration process according to one embodiment of the present disclosure.

FIG. 1 is a schematic diagram of a bicycle configuration system, further illustrating variations and steps in a bicycle configuration process. As depicted in FIG. 1, components are manufactured by an OEM 105, a bicycle or kit is assembled by vendor 110, and the bicycle is obtained (either by sale or by rental) or the kit is assembled by end user 115.

At OEM 105, the component may be manufactured according to desired specifications 122. Configuration information from OEM 105 may be stored at configuration server 130 or communicated to user profile server 135, vendor server 125, or device 116. A configuration process may include step 106 of OEM 105 adding a label with configuration information on the label. In addition to information such as part number or serial number, other information may be added. For example, if the component is manufactured to fulfill a customer order, information about the end user 115 may be included, such as a preferred language, units, or the like. Configuration information may be received or otherwise obtained from configuration server 130.

A configuration process may include step 111, in which information is sent from OEM 105 to configuration server 130. Information sent to configuration server 130 may include information including compatibility information relative to other components manufactured by other OEMs 105. Information from other OEMs 105 may include inertia information from a wheel or tire OEM; weight, inertia, center of gravity or other properties of a frame from a frame OEM; wheel dropout angle, depth or other metrics information from a frame OEM, and the like.

Components (e.g., frames, wheels, rims, gears, electric motors, transmissions, etc.) from various OEMs 105 may be obtained by vendor or other entity 110 during the production of a bicycle. A configuration process may include step 107, in which a label may be read to get information. Machine-readable optical labels may be used to communicate configuration information. A QR Code™ is one example of a matrix barcode that contains information about the item to which it is attached. A vendor or other entity 110 in the supply chain may use an imaging device to scan the optical label and determine or verify the country of manufacture (country of origin) for a component, assembly or bicycle. Information stored in either a central computer or a computer controlled by the entity may be used to configure the bicycle. For example, if a bicycle dealer in Germany scans an optical label, information about the bicycle may be presented in German and any units may be metric, whereas if a bicycle dealer in the United States were to scan the same optical label, information about the bicycle may be presented in English and any units may be standard, whereas if a bicycle dealer in England were to scan the same optical label, information may be presented in English and any units may be imperial.

A configuration process may include step 112, in which setup information is retrieved by entity 110 from configuration server 130. In some embodiments, entity 110 may have an imaging device to scan an optical label, a radio-frequency identification (RFID) reader to identify a tag, or some other technology to determine information about a component, subassembly, assembly or bicycle. For example, in some embodiments, a QR code or other optical label may include serial number information, part number information, country of origin (manufacture), vendor information, dealer information, user information, or the like. With this information, configuration of a bicycle may be performed by entity 110.

In some embodiments, a bicycle may utilize a system controller and a CVT controller. Configuration information may be analyzed by vendor server 125 to determine which CVT controller is a best match for the system controller. Or, if there is a particular CVT controller running a certain version of firmware, configuration server 130 may provide information about what system controller should be used or is preferred, a preferred setup sequence, or the like. In some embodiments, configuration server 130 may contain instructions for configuration that can be loaded onto a system controller or a CVT controller independent of the other, such that an end user can trigger or request a final connection between the two controllers and the controllers immediately communicate with each other.

In some embodiments, configuration information read from a label is analyzed to select what configuration information is retrieved from configuration server 130. For example, entity 110 may have information about a preferred system controller configurable to communicate with any of several different CVT controllers available, with each CVT controller using a different communication protocol (including different versions of the same protocol). If a label is scanned and it is determined that a particular CVT controller is to be used with the preferred system controller, embodiments may retrieve the appropriate software from configuration server 130.

A configuration process may include step 113, in which information may be obtained by end user 115 from vendor server 125. Information stored on vendor server 125 may include information about an end user for whom the bicycle is intended, a jurisdiction or geographic area in which the bicycle is to be used, or the like. In some embodiments, information about a geographic area in which the bicycle is to be used includes instructions that the system controller or CVT controller will execute to operate according to particular laws or regulations. For example, if a particular municipality has a maximum bicycle speed, execution of the instructions may control the CVT in a way that optimizes the CVT at speeds less than the maximum speed. In some embodiments, vender server 125 may communicate with OEM 105, device 116, user profile server 135, or configuration server 130 to obtain configuration information, reconcile information or settings, and communicate configuration information to a CVT controller or a system controller.

A configuration process may include step 114, in which information may be obtained from user profile server 135. End user 115 may have set up a profile that is stored in user profile server 135. If end user 115 purchases a new bicycle or rents a bicycle having a system controller or a CVT controller, fields in the user profile may be analyzed to control operation of the CVT according to user preferences. For example, end user 115 may prefer smoother acceleration instead of quick acceleration, or may want more motor assistance on a rental bike than on a bike owned by end user 115. In any case, a user profile stored on user profile server 135 may store this information in various fields and provide the information to a vendor 110 either at a time of purchase (or rental) or some other point of time. End user 115 may navigate through a series of steps to capture information, may be presented a limited number of options, or may use other means to capture information, discussed below.

Figure 2:
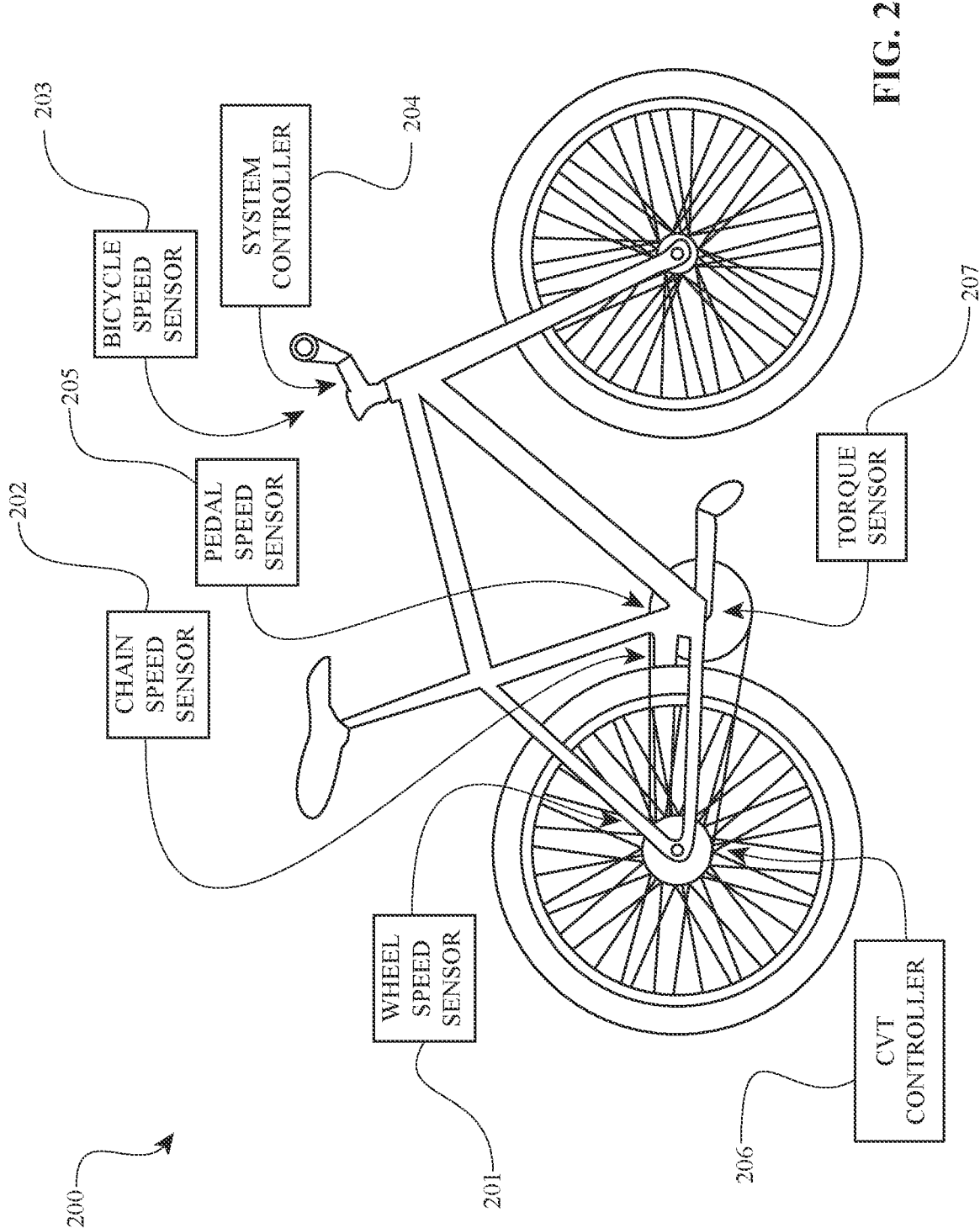
FIG. 2 is a simplified view of a bicycle, illustrating typical mounting locations for various features according to one embodiment of the present disclosure.

In addition to the above information, a configuration process may include determining or obtaining other information about the system being configured. FIG. 2 depicts a simplified view of a bicycle, illustrating typical mounting locations for wheel speed sensor 201, chain speed sensor 202, bicycle speed sensor 203, system controller 204, pedal speed sensor 205, CVT controller 206 and torque sensor 207 on bicycle 200. However, different vendors may use different sensors mounted in different locations on the bicycle. Pedal speed sensors are one example of a sensor that may vary according to the vendor with respect to location, orientation, signal parameters such as frequency, etc. Also, CVT controller 206 may be positioned at the rear wheel axle or at the bottom bracket. Embodiments may determine what sensors are available, where the sensors are positioned and other information, and configure the bicycle accordingly.

Figure 3A:
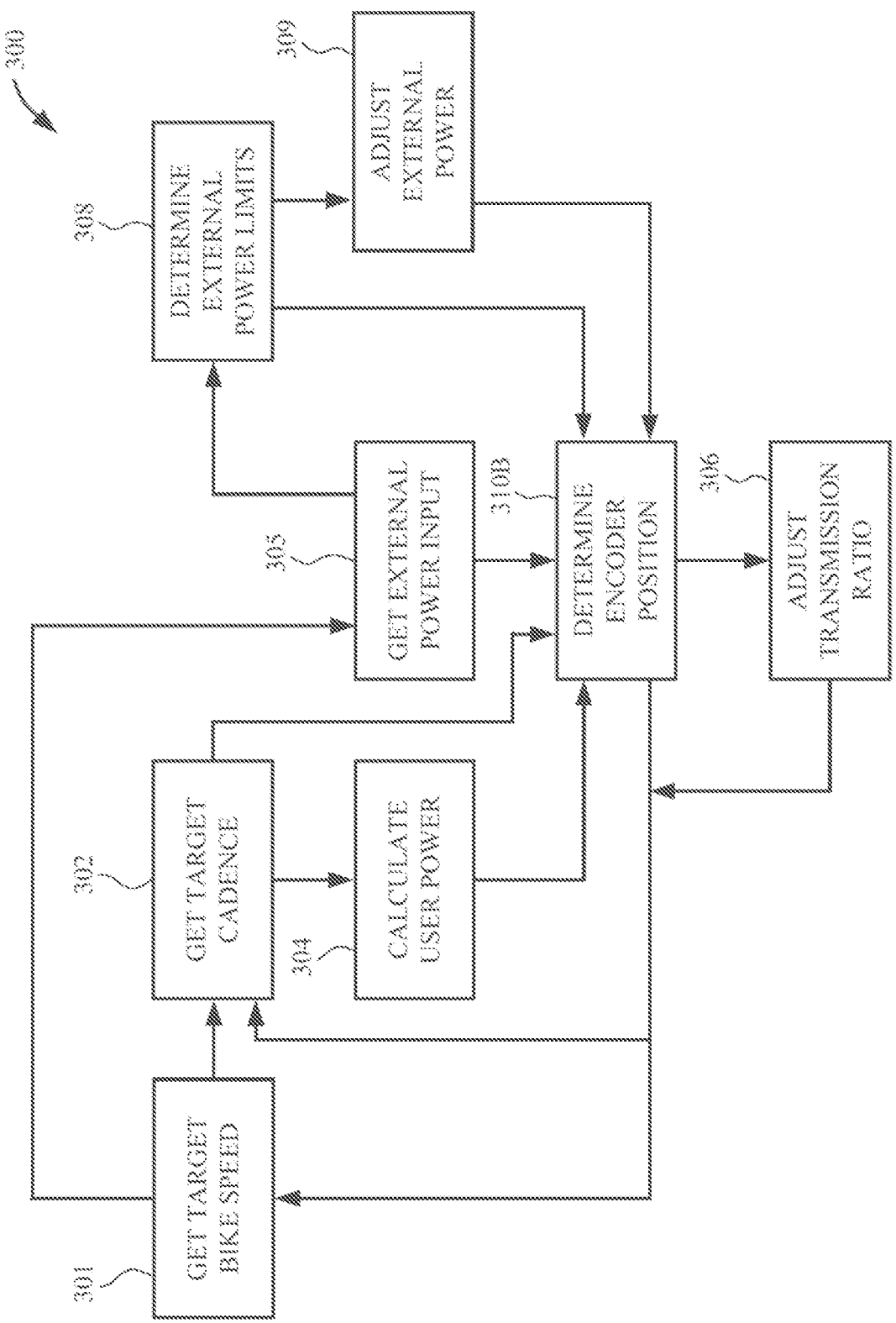
FIG. 3A is a flow diagram, illustrating variations and steps in a CVT control process according to one embodiment of the present disclosure.

Various bicycles and control systems may need to know different information in order to automatically configure for a particular component, subassembly, assembly, drive train, bicycle, environment, rider, manufacturer or intermediary. Not all information is required for each scenario. FIG. 3A depicts a flow diagram, illustrating variations and steps in a CVT control process.

Example 1: As shown in FIG. 3A, a CVT control method 300 may include step 302 of getting a target cadence (e.g., from system controller 204) and step 306 of adjusting the transmission ratio using system controller 204 or CVT controller 206 (see FIG. 3B).

Example 2: As shown in FIG. 3A, a CVT control process 300 may include step 302 of getting a target cadence (e.g., from system controller 204), step 304 of calculating user power and step 306 of adjusting the transmission ratio using system controller 204 or CVT controller 206.

Example 3: As shown in FIG. 3A, a CVT control process 300 may include step 301 of getting a target bike speed (e.g., from bicycle speed sensor 203), step 302 of getting a target cadence (e.g., from system controller 204), step 304 of calculating user power and step 306 of adjusting the transmission ratio using system controller 204 or CVT controller 206.

Example 4: As shown in FIG. 3A, a CVT control process 300 may include step 301 of getting a target bike speed (e.g., from bicycle speed sensor 203), step 302 of getting a target cadence (e.g., from system controller 204), step 304 of calculating user power, step 305 of getting external power input (e.g., from system controller 204 or from sensors associated with the external power source) and step 306 of adjusting the transmission ratio using system controller 204 or CVT controller 206.

Example 5: As shown in FIG. 3A, a CVT control process 300 may include step 301 of getting a target bike speed (e.g., from bicycle speed sensor 203), step 302 of getting a target cadence (e.g., from system controller 204), step 304 of calculating user power, step 305 of getting external power input (e.g., from system controller 204 or from sensors associated with the external power source), step 308 of determining external power limits (e.g., battery capability, maximum power capacity, available power capacity, power capacity allowed by rules or environment) and step 306 of adjusting the transmission ratio using system controller 204 or CVT controller 206.

Example 6: As shown in FIG. 3A, a CVT control process 300 may include step 301 of getting a target bike speed (e.g., from bicycle speed sensor 203), step 302 of getting a target cadence (e.g., from system controller 204), step 304 of calculating user power, step 305 of getting external power input (e.g., from system controller 204 or from sensors associated with the external power source), step 308 of determining external power limits (e.g., battery capability, maximum power capacity, available power capacity, power capacity allowed by rules or environment), step 309 of adjusting the external power and step 306 of adjusting the transmission ratio using system controller 204 or CVT controller 206.

Figure 3B:
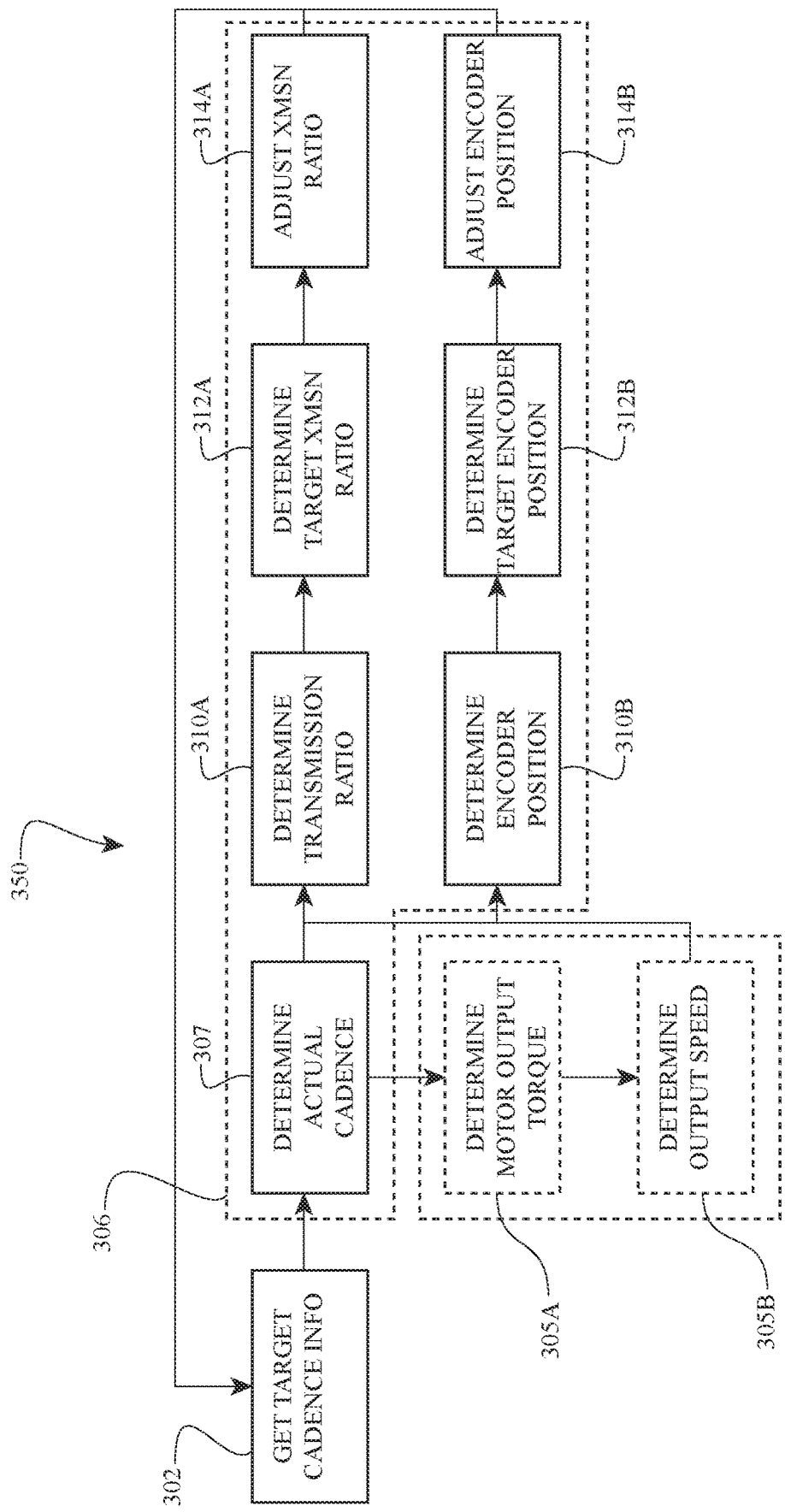
FIG. 3B is a schematic diagram, illustrating steps and variations in a CVT control scheme according to one embodiment of the present disclosure.

FIG. 3B depicts a schematic diagram, illustrating steps and variations in a CVT control scheme.

Example 1: As shown in FIG. 3B, a CVT control process 350 may include step 302 of getting a target cadence (e.g., from system controller 204), step 307 of determining an actual cadence (e.g., from pedal speed sensor 205), step 310A of determining a transmission ratio, step 312A of determining a target transmission ratio, and step 314A of adjusting the transmission ratio. Steps 310A, 312A and 314A may be performed by CVT controller 206 or system controller 204 in communication with CVT controller 206.

Example 2: As shown in FIG. 3B, a CVT control process 350 may include step 302 of getting a target cadence (e.g., from system controller 204), step 307 of determining an actual cadence (e.g., from pedal speed sensor 205), step 310B of determining a encoder position, step 312B of determining a target encoder position, and step 314B of adjusting the encoder position. Steps 310B, 312B and 314B may be performed by CVT controller 206 or system controller 204 in communication with CVT controller 206.

Example 3: As shown in FIG. 3B, a CVT control process 350 may include step 302 of getting a target cadence (e.g., from system controller 204), step 307 of determining an actual cadence (e.g., from pedal speed sensor 205), steps 305A of determining a motor output torque and step 305B of determining a motor output speed, step 310A of determining a transmission ratio, step 312A of determining a target transmission ratio, and step 314A of adjusting the transmission ratio. Steps 310A, 312A and 314A may be performed by CVT controller 206 or system controller 204 in communication with CVT controller 206.

Example 4: As shown in FIG. 3B, a CVT control process 350 may include step 302 of getting a target cadence (e.g., from system controller 204), step 307 of determining an actual cadence (e.g., from pedal speed sensor 205), steps 305A of determining a motor output torque and step 305B of determining a motor output speed, step 310B of determining a encoder position, step 312B of determining a target encoder position, and step 314B of adjusting the encoder position. Steps 310B, 312B and 314B may be performed by CVT controller 206 or system controller 204 in communication with CVT controller 206.

In addition to these examples and other variations, a manufacturer may want systems in a preferred warranty configuration, a user might want several different bikes to be configured such that they all have approximately the same feel, local laws and regulations may also dictate how a bicycle can be configured (particularly if the bicycle is an e-bike or otherwise has external (non-human) power applied in lieu of or in addition to user pedal input), etc.

A configuration system determines what information is going to be used to control a CVT. Furthermore, a configuration system may also establish what controller, software or combination will be managing the control of the CVT.

In some embodiments, configuration instructions may establish that a CVT controller may receive only specific instructions for changing a tilt angle for the CVT, and a system controller communicatively coupled to the CVT controller will receive, determine or otherwise obtain information and forward information to the CVT controller necessary to adjust the CVT. For example, in a simplest scenario, a system controller may obtain pedal speed ("cadence") information indicating the number of revolutions per minute (RPM) of the pedals. If the cadence is higher than a predetermined cadence, the system controller sends information to the CVT controller indicating a desired CVT setting (e.g., set transmission ratio to 1:1) or a desired change in a CVT setting (e.g., increase tilt angle by 2 degrees).

In other embodiments, configuration instructions may establish that the system controller may perform a portion of the calculations and sending a signal to the CVT controller, with the CVT controller calculating, referencing table lookups, or otherwise determining only the signals or processes needed to adjust the CVT based on the signal received from the system controller. The CVT controller adjusts the transmission ratio for the CVT based on the signal received from the system controller. For example, the system controller may determine the present pedal speed and signal that information to the CVT controller, along with a direction to adjust the CVT transmission ratio to achieve a desired pedal speed or to increase/decrease the pedal speed by a certain number of RPMs. Upon receiving the information, the CVT controller calculates, references a table lookup, or otherwise determines what tilt angle or encoder position is needed to achieve the desired pedal speed, and adjusts the CVT accordingly.

In other embodiments, information is provided by the system controller to the CVT controller, and the CVT controller determines how to achieve a desired transmission ratio, a desired change in transmission ratio, an output speed, a desired change in output speed, or the like. The system controller may determine the present wheel speed and a desired wheel speed and signal the information to the CVT controller, which calculates, uses lookup tables, or otherwise determines a necessary tilt angle and adjusts the CVT accordingly. For example, a system controller may determine bicycle speed and pass the information to the CVT controller. The CVT controller may have stored in memory the number of teeth on a front gear, the number of teeth on a rear gear, and a circumference of a rear wheel. Then, if a user wants to pedal at a selected pedal RPM (including a pedal RPM range), the CVT controller may determine the pedal RPM based on the bicycle speed (received from the system controller) and the gear ratio between the front gear and the rear gear (stored in local memory), and can then adjust the CVT transmission ratio accordingly. Those of skill in the art will appreciate that the CVT controller might know the number of teeth on the front gear and the number of teeth on the rear gear, or might know the ratio between the front gear and the rear gear.

The number, type, or position of sensors may differ among bicycle frames and components. Furthermore, in some embodiments, one or more sensors may communicate directly with the CVT controller. The CVT controller may communicate with the system controller and also may receive signals associated with pedal speed (RPM), pedal torque, chain speed, or the like, directly from the sensor(s). For example, in systems having multiple gears, the CVT controller may receive a signal indicating chain position (indicating in which gear the chain is engaged). In these scenarios, a system controller may receive chain position information and send the CVT controller the information necessary to adjust the CVT. The system controller may receive information on chain position and either send the information directly to the CVT controller or determine a gear ratio (corresponding to the ratio of the front gear to the rear gear) and send the gear ratio to the CVT controller. In some embodiments, a sensor may be integrated into the CVT controller, including integration in a wiring harness. In other embodiments, the CVT controller may receive chain position information either directly from the sensors or from the system controller and determine the gear ratio. The CVT controller may then determine an appropriate transmission ratio based on the gear ratio.

The foregoing describes various systems implementing system controllers and CVT controllers. A process for establishing these control schemes may be set up by a user in various ways, discussed below.

A process for configuring a bicycle control system by an OEM may involve communicatively coupling a CVT controller, a system controller, or both to an OEM server or other computer. If the OEM is producing a finished bicycle, the OEM server or computer may provide additional information to the CVT controller or the system controller. Information provided to the CVT controller may include gear ratio, the number of teeth on a front gear, the number of teeth on a rear gear, the number of front gears, the number of rear gears, a chain length, or the like. Information provided to a system controller or CVT controller may also include control information, including closed loop control parameters, open loop control parameters, parameters for switching between closed loop and open loop control, calibration parameters including triggers for initiating calibration, calibration steps, and triggers for ceasing calibration. In some embodiments, triggers may include operating conditions. Operating conditions may include information such as pedal RPM, pedal torque, the presence of a load, etc. As an example, a controller may detect or receive signals indicating a user is applying a large torque or there is a high pedal speed but slow vehicle movement. The controller may determine that this is a high (or heavy) load. The CVT may then determine that the CVT should be operating in a closed loop. If the pedal speed or torque decreases or the vehicle speed increases, the controller may determine the bicycle is operating with a lighter load and may switch to an open loop process.

In some embodiments, once the system controller or CVT controller is powered up by the user, execution of a set of instructions enables the system controller or CVT controller to begin operation in either closed loop or open loop control, according to one or more parameters. The system controller or CVT controller may communicate with an OEM server or other computer to set up or configure a controller area network (CAN), including initializing communications between sensors and the CVT controller or system controller and ensuring communication compatibility between the system controller and the CVT controller. Ensuring communication compatibility between the system controller and the CVT controller may include establishing a rate of communication between the CVT controller and the system controller, whether communications are to be push type (automatically provided) communications or whether they should be prompted. For example, if the system controller performs all calculations and directs the CVT controller to adjust the tilt angle to reach a desired tilt angle, the CVT controller may automatically provide the system controller with information about the tilt angle in response to a command to change the tilt angle.

Initial setup may be completed by the OEM through an implemented bike identification (ID) on a drive system electronic control unit (ECU). In step 122, OEM 105 may receive configuration information in the form of specifications and feedback from configuration server 130, or may receive configuration information from vendor server 125 in step 109. Either at vendor 110 or end user 115, a controller unit then provides a handshake and configures the system according to according to one or more predefined settings provided by OEM 105 and stored in a bike ID library on configuration server 130.

In one embodiment, an auto-configuration system may include a controller area network (CAN) with a system controller communicatively coupled to sensors and a CVT controller. At start up, the system controller sends a mutually pre-defined packet over the CAN bus to the CVT controller which stores information about components. The number of teeth on a front gear (Tf), the number of teeth on a rear gear (Tr), and the rear wheel circumference (Cw) may be included in the information. The CVT controller initializes a variable for each Tf, Tr and Cw from non-volatile memory, then when the CVT controller receives the mutually defined pack from the system controller, it updates the variables in volatile memory.

In one embodiment, an auto-configuration system may include a controller coupled to a plurality of sensors and further communicatively coupled to a GPS or other distance sensor. The sensors may include a CAN, a Wp (Pedal Speed Sensor), a Wc (Gear or Cog Speed sensor), a Ww (Wheel Speed Sensor), and a GPS or other distance sensor. At start up, the system controller and the CVT controller load default parameters. A set of steps or subroutines are then performed by a set of computer instructions stored in memory and executable by the controller.

Calculation of a wheel circumference may be performed as follows. The system controller transmits a mutually pre-defined packet to a CVT controller with the variable DISTANCE set to zero and clears a distance counter. When the CVT controller receives the packet with the variable DISTANCE set to zero, it clears a counter for Output Speed Ring (OSR) counts (e.g. 6 pulses per rev (ppr), OSR_ppr) and begins accumulating OSR counts until the system controller sends the mutually pre-defined packet to the CVT with the variable DISTANCE set to a non-zero value. On receiving a non-zero value the CVT will compute the wheel circumference (Cw) then store the value in a variable in non-volatile memory.

Once the distance is known (such as by riding a known distance, using GPS or some other means), the wheel circumference may be calculated as:

$$Cw=DISTANCE/(OSR\_pulses/OSR\_ppr) \quad \text{(Equation 1)}$$

whereby the wheel circumference is calculated based on output speed ring (OSR) pulses divided by OSR Pulses per revolution. This calculation and method can be repeated for a short duration to get a quick estimate shortly after power up, then a longer distance can be used to refine the value.

In some scenarios, a CVT controller may function knowing only the ratio of Tf:Tr. This ratio can be discovered by the system controller, which then transmits a mutually pre-defined packet to the CVT controller with the variable PEDAL_REVOLUTIONS to zero and clears a variable PEDAL_REV counter. When a controller receives the packet with the variable PEDAL_REVOLUTIONS set to zero, it clears a counter for the variable INPUT_SPEED_RING_COUNTS (e.g. 12 pulses per rev, ISR_ppr) and begins accumulating input speed ring (ISR) counts until the system controller sends the mutually pre-defined packet to the controller with the variable PEDAL_REVOLUTIONS set to a non-zero value. Upon receiving a non-zero value, the controller will compute the ratio Tf:Tr, then store the value in a variable in non-volatile memory. The equation:

$$Tf:Tr \text{ ratio}=PEDAL\_REVOLUTIONS/(ISR\_pulses/ISR\_ppr) \quad \text{(Equation 2)}$$

may be used to determine the ratio of Tf to Tr.

In some embodiments, on initial startup, a user enters the make and model of the bicycle. The controller may compare the information about make and model to a database and determine a default configuration based on the determination. In some embodiments, the determination involves identifying a preferred configuration for that specific bicycle. In other embodiments, determination of a default configuration involves determining a make and model similar to the make and model entered by the user.

In one embodiment, a drive system manufacturer integrates a bootloader function into their system.

In some bicycles, there may be an external power source such as an electric motor or a small engine, or some other variation which increases the amount of information needed. Embodiments may obtain or determine information about the state of operation of electric components. In a configuration process, information about the operating parameters of the external power source may be stored in a configuration server, an OEM server, or a vendor server. During the bicycle production process or a control configuration process, part or all of this information may be installed on a system controller or a CVT controller. The system controller or CVT controller may receive information regarding a preferred power range and configure a plurality of operating modes, taking into account the preferred power range. During operation of the bicycle in any of the operating modes, the CVT controller or the system controller can monitor the individual components, the interaction between two components, or the bicycle as a whole and provide feedback to OEM 105 or entity 110 for future bicycle production.

For some users, bicycles or environments, entering the make and model for a bicycle will be easy. However, if the user is not familiar with what to look for or where to look for information, this task can be more daunting. For example, if a user is unfamiliar with bicycles or bicycle components, they may be unsure of the exact make and model. Compounding this is issues with language and branding across different regions. For example, a bicycle may be referred to by a first name in a first country and a second name in a second country. If a user in the second country doesn't recognize that the two bicycles are actually the same bicycle but with different names, the user might enter the wrong make and model, might need to perform iterations to determine the correct make and model, or might become frustrated and not purchase the bicycle.

In some embodiments, end user 115 is presented a limited number of options for configuring a bicycle. For example, instead of asking end user 115 to enter the number of teeth, embodiments may prompt the user to determine if the front gear has 54, 58 or 60 teeth. A method for configuring a bicycle may include a configuration storing possible values for CVT controllers, system controllers, and other components. For example, a front gear on a mountain bike typically has fewer teeth (and is smaller) than a front gear on a road bike. Thus, a controller on a mountain bike might provide end user front gear teeth options that are below a predetermined number (e.g., less than 48) while the same controller mounted on a road bike might provide end user 115 front gear teeth options that are above a predetermined number (e.g., greater than 49). In this manner, embodiments assist end user 115 in configuring the bicycle in a way that reduces the possibility for errors while still allowing end user 115 to participate in the configuration process. Other examples of bicycles include commercial bicycles which may have a large storage container to allow a user to transport cargo, passengers or other heavy items (and may actually have three or more wheels), recumbent bicycles, and other variations.

In other embodiments, a system controller or CVT controller may be communicatively coupled to a device capable of scanning an optical label. For example, in some embodiments, an application running on an imaging device or a smart phone or other user device may be used to read the optical label and provide the necessary information to the CVT controller, the system controller or both.

Figure 4:
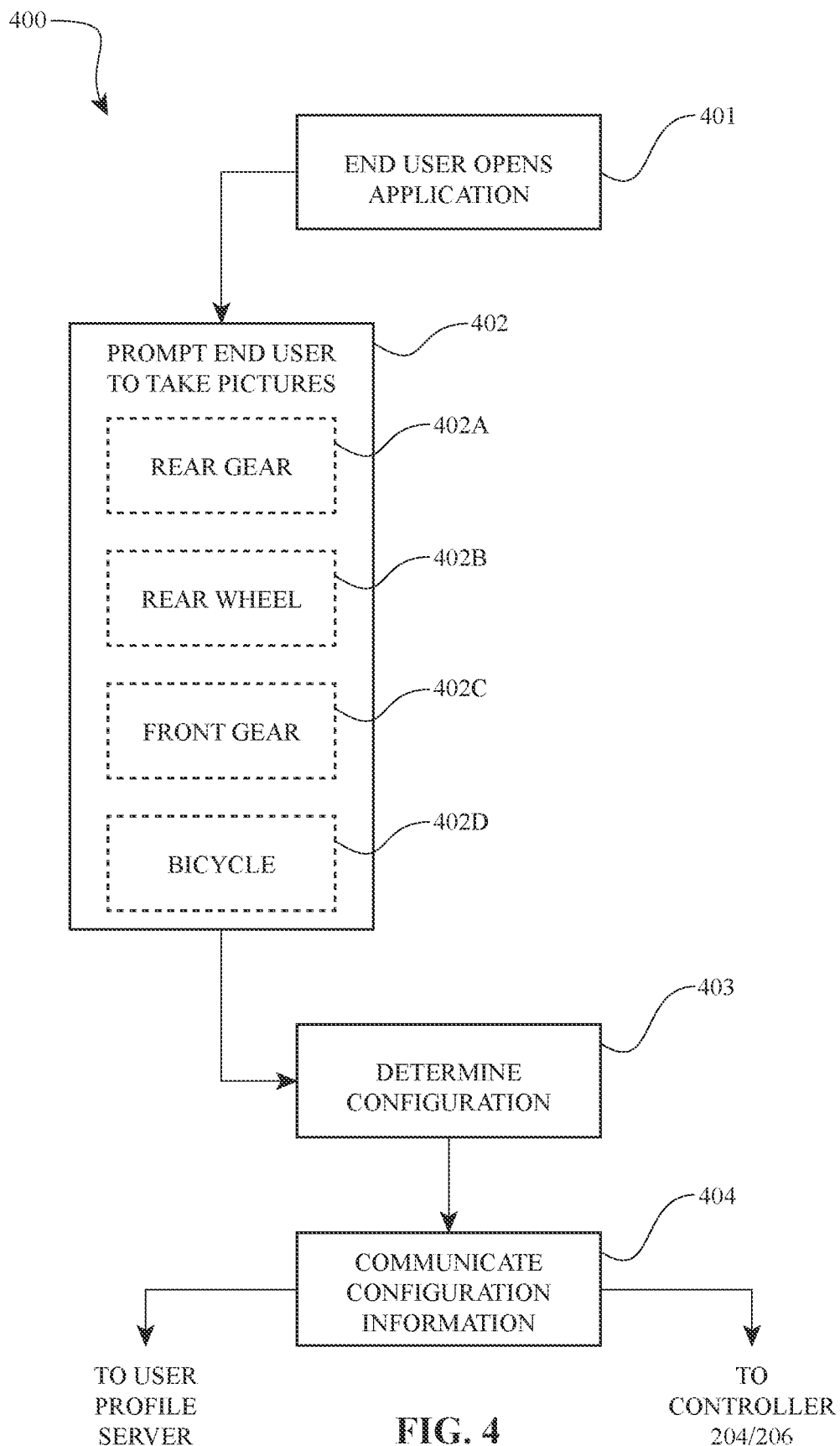
FIG. 4 is a diagram, illustrating a method for enabling a user to capture information without manually entering each piece of information according to one embodiment of the present disclosure.

In some embodiments, end user 115 may use existing technology in the form of a camera feature commonly found on smartphones and other devices to capture information about the physical configuration of a bicycle and use that information to operationally configure the bicycle. FIG. 4 depicts a diagram, illustrating a method for enabling a user to capture information without manually entering each piece of information.

In step 401, a user opens an application on a user device, such as but not limited to a smart phone, a personal data assistant, a tablet, or any other appropriate electronic device. The application may be stored on the smartphone or may be an agent operating on the smartphone that communicates with an application running on a server that is configured to perform some or all of the processing.

In step 402, the application prompts the user to take pictures of the bicycle physical configuration. The application may determine which component(s) is (are) being captured in an image or may separate the process into steps 402a-402d.

In step 402a, the application prompts the user to take a picture of the rear gear. The application may provide information such as a picture or graphic of where the rear gear is located, what angle the camera should be relative to the rear gear, or otherwise assist the user in capturing the best image of the rear gear.

In step 402b, the application prompts the user to take a picture of the rear wheel. The application may provide information such as a picture or graphic of where the rear wheel is located, what angle the camera should be relative to the rear wheel, or otherwise assist the user in capturing the best image of the rear wheel.

In step 402c, the application prompts the user to take a picture of the front gear. The application may provide information such as a picture or graphic of where the front gear is located, what angle the camera should be relative to the front gear, or otherwise assist the user in capturing the best image of the front gear.

In step 402d, the application prompts the user to take a picture of the bicycle. The application may provide information such as what angle the camera should be relative to the rear gear, or otherwise assist the user in capturing the best image of the rear gear.

In a further step, the application may prompt the user to take a picture of the front gear and rear gear. The application may provide information (e.g., what angle the camera should be aimed) to assist the user in capturing the best image of the front gear and the rear gear.

In step 403, the information captured by the images is analyzed either by execution of a set of instructions installed on the smart phone, stored in memory on a controller associated with the bicycle or a CVT on the bicycle communicatively coupled to the smart phone, or by a server communicatively coupled to the smart phone. Analysis of the images determines physical parameters of the bicycle. For example, regarding the image of the rear gear or the front gear, a set of instructions may superimpose an overlay correlated with a gear having a selected number of overlay teeth on the image of the gear. If the gear teeth are not detectable due to the overlay teeth covering them or in proximity, the analysis may conclude that the number of gear teeth is the same as the number of overlay teeth. Hence, the number of gear teeth for the front gear or the rear gear can be determined. Similarly, the overlay may be used to determine the gear size or other information. In some embodiments, a set of instructions may be executed to determine two teeth on the gear. Knowing the arc angle between the two teeth and the radius of the gear, the number of teeth may be calculated. In some embodiments, a profile of a tooth may be compared against existing tooth designs to determine a manufacturer of the gear. If the manufacturer of the gear is known, a gear from the manufacturer's catalog may be determined.

In step 404, the configuration information is communicated to a controller (system or CVT) or a user profile server 135. User profile server may remain communicatively coupled to user device 116 to ensure any configuration is accurate and complete.

In a similar way, the size of the rear wheel, the crank arm length, and other bicycle physical configuration information may be determined. In some embodiments, the step of determining bicycle physical configuration information may be performed by executing a set of instructions on a smartphone, by a server communicatively coupled to the smartphone, or some combination.

Information captured by the smartphone may be sent to one or more computing devices. For example, FIG. 1 shows step 132 in which information from the user device 116, such as a smartphone, is used to create user profile 113, step 142 in which information from the smartphone is sent to vendor computer 125, and step 152 in which information from the smartphone is sent to configuration server 130. The information may be used to calibrate a bicycle for end user 115 or may provide feedback to OEM 105 for future bicycle production.

Auto-Calibration

The systems and methods described above may be useful for configuring a bicycle with little or no involvement by the end user. Over time, however, the operating speed, the power source or the power load may cause slip or otherwise bias the CVT into an unwanted state in which slipping and other negative effects may occur. To avoid these problems or provide an improved rider experience, CVTs may be calibrated. Calibration for a CVT typically involves finding the mechanical limits of the shift system and therefore the ratio limits for the continuously variable transmission.

In one embodiment, a user may ride the bicycle and the CVT may be calibrated by adjusting the transmission ratio from full underdrive (FUD) to full over drive (FOD) and back to FUD. The wheel circumference may be calculated, and a range and transmission ratio may be calculated based on values for the top and bottom ratings. In other embodiments, calibration may involve only a portion of the full range. For example, for safety reasons, having a rider pedal in FOD may be undesirable due to health concerns for the rider or the route along which the bicycle would be ridden to perform the calibration. In these cases, calibration may be performed over the bottom half of the range. The calibration may start with the CVT at FUD and ridden until the CVT is determined to be operating at 1:1. For the bottom half of the range, the CVT will be verified against empirical test data. Above 1:1, the bicycle may be calibrated against a theoretical set of data, a range may be extrapolated, or the like. If the rider actually adjusts the bicycle to FOD, embodiments may then perform calibration between FOD and 1:1 or between FOD and FUD to develop empirical data.

Figure 5A:
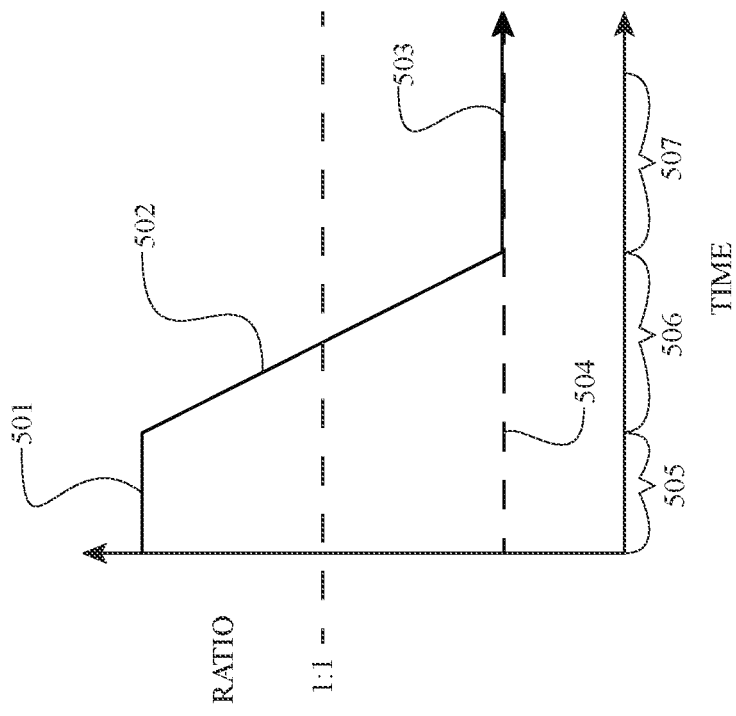
FIG. 5A is a diagram, illustrating transmission ratio over time according to one embodiment of the present disclosure.

In other embodiments, calibration may include correcting for various loads in a CVT. FIG. 5A depicts a diagram, illustrating transmission ratio over time. A CVT may operate at a first ratio 501 for a time 505. A CVT controller may receive an instruction to adjust a transmission ratio or may determine a desired transmission ratio 502. A command may be sent by the CVT controller to an encoder to initiate an adjustment toward the desired transmission ratio. However, a load applied to the transmission may affect the transmission ratio. As illustrated in FIG. 5A, actual transmission ratio 502 may never equal target transmission ratio 504. Embodiments may correct for the load applied in various ways.

Figure 5B:
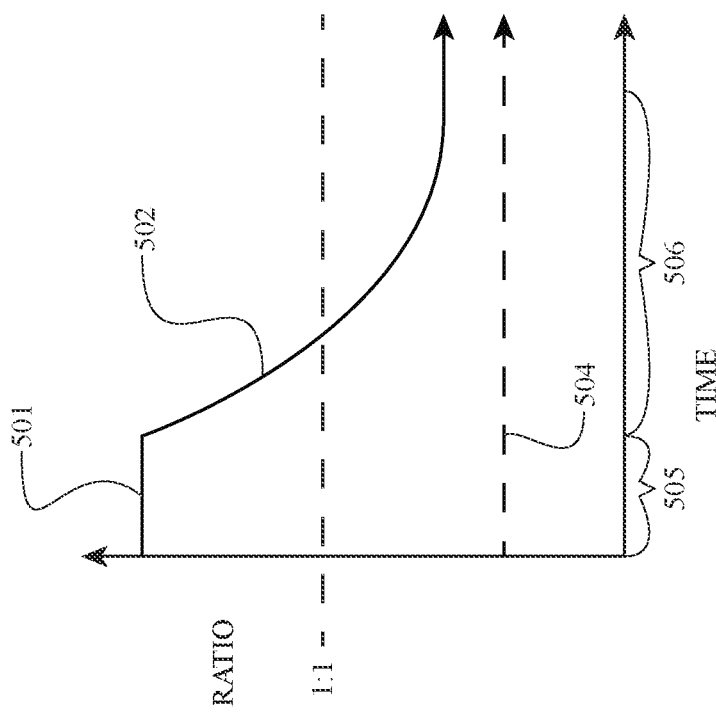
FIG. 5B is a diagram of transmission ratio relative to time, illustrating a control scheme using open loop and closed loop control schemes under different conditions according to one embodiment of the present disclosure.

A control scheme may include closed loop and open loop algorithms. FIG. 5B depicts a diagram of transmission ratio relative to time, illustrating a control scheme using open loop and closed loop control schemes under different conditions. The CVT may be operating at a first ratio 501 for time 505. A CVT controller may receive an instruction to adjust a transmission ratio or may determine a desired transmission ratio 503. A command may be sent by the CVT controller to an encoder to initiate an adjustment toward the desired transmission ratio according to a closed loop algorithm. Using the closed loop algorithm over time 506, the controller is able to accurately adjust the CVT so the actual transmission rate 503 is equal to desired ratio 504. The CVT controller may then switch to an open loop control scheme for time 407.

A closed loop algorithm may ensure the transmission ratio is adjusted according to a desired rate 506, occurs over a desired time 506, or some other parameter. Operating according to a closed loop algorithm may require more (battery) power to receive sensor information, perform the necessary calculations, and communicate between controllers to adjust the CVT. Accordingly, a closed loop control system may require more sensors, a larger battery, more memory, a faster processor, or the like. Operating according to an open loop control scheme may be less accurate. However, an open loop control scheme will generally require less information (from fewer sensors), and may be more tolerant to variations in bicycle performance (e.g., a person pedaling, then coasting). Some embodiments may utilize both a closed loop and an open loop control scheme. When a command is given to adjust the transmission ratio, the control system may operate according to a closed loop control scheme. Once the CVT reaches the desired a desired transmission ratio, the control scheme may switch back to an open loop control algorithm. The closed loop control scheme may be initiated whenever a load is detected, when cadence is above (or below) a threshold, or the like. In some embodiments, the determination of whether to use a closed loop or an open loop control scheme may occur during manufacturing or configuration. For example, if a system controller is going to be used on a racing bike, a closed loop scheme may be used, whereas the same controller being used on a beach cruiser may operate according to an open loop system. There are advantages to operating according to either closed loop or open loop control schemes. For example, a closed loop control scheme may be more accurate. In some embodiments, when a command is given (either by a system controller or a CVT controller) to adjust a CVT to a desired transmission ratio, the control scheme operates according to a closed loop algorithm.

In some embodiments, calibration may include determining a polynomial or other function representing a transmission performance parameter. For example, a polynomial may be determined for transmission ratio relative to applied loads. A CVT may operate under a control scheme based on a first polynomial. If a controller determines a load on the CVT, the controller may determine a new polynomial. In a simple scenario, determining a load on the CVT may be achieved by determining an input speed and input torque for a rider. In other scenarios, determining a load on a CVT may be achieved by determining an input speed and torque produced by a rider and an input speed and torque produced by a motor or a motor torque and motor current.

Calibration may employ an adaptive algorithm that uses available inputs to discover the shift system mechanical limits during normal operation and with as few interruptions to normal use as possible. On initial startup, the make and model of the bike and a default configuration setting is established and stored in memory. Over the course of a ride, a CVT controller, a system controller constantly stores data for a period of time (e.g., 30 seconds, 1 minute, etc.) for certain inputs. If the rear wheel speed and cadence demanded is constant for more than a certain period of time (say 30 seconds) then the computer continues to record data in that dataset until the rear wheel speed changes by more than a preset amount (say 5 RPM) at that point the computer considers the dataset and calibrates for the beginning of the dataset and the end and adjusts the configuration settings according to any mismatch of the configured output. In some embodiments, the calibration is performed using GPS coordinates, such as adjusting a setting according to a mismatched data of a calculated output from the GPS setting.

In another embodiment, a calibration system may compare information received from one or more sensors and compare the information with predicted values stored in memory. A bicycle may have sensors for pedal torque, pedal speed, chain speed, chain position, wheel speed and bicycle speed. A calibration system may receive and compare values for pedal speed, wheel speed and bicycle speed to determine a predicted pedal torque. If the predicted pedal torque value differs from an actual torque value by a threshold amount, calibration may be initiated. A chain speed sensor, a wheel speed sensor, and the ratio Tf:Tr may be used to determine pedal speed. A chain speed sensor may employ a magnetized chain component or a magnet embedded with a chain, and a sensor capable of detecting the magnet as it passes by each rotation. An advantage to using a chain speed sensor is that the sensor may be positioned anywhere along the chain path, and can be positioned away from the wheel hubs and pedals. Other types of sensors, including optical sensors capable of detecting variations in chain dimensions or optical cues, are possible.

A method of configuring a controller for a continuously variable transmission on a bicycle may include establishing a first configuration setting, monitoring a set of riding data to determine when a steady state speed is maintained for a specified period of time, recording the riding data until the earlier of a second specified period or until the riding data deviates by a predetermined amount from the steady state speed, identifying a control set of data by comparing a first set of GPS data at the beginning of the recorded data to a second set of GPS data at the end of the recorded data, comparing the recorded data against the control set of data to develop an error value, and establishing a second configuration setting for the controller based on the error value. In some embodiments, the method may include requesting and receiving an input of information from a user, and correlating the information received from the user with a set of stored data to establish the first configuration setting. In some embodiments, the information that is provided in the input of information step comprises one or more of the following; bicycle model, tire size, the number of front chain ring teeth, the number of rear cog teeth, bicycle size and serial number. In some embodiments, the riding data can include one or more of wheel speed, pedal cadence, expected bicycle speed, bicycle position and continuously variable transmission ratio. In some embodiments, the steps of monitoring, recording, identifying, comparing and establishing a second configuration setting are repeated until the error value is within a specified tolerance. In some embodiments, the process is repeated to monitor the configuration setting and ensure it remains within the specified tolerance. The process may be repeated periodically or when the bike senses certain conditions, such as a flat (or relatively flat) profile. In some embodiments, the period of time between monitoring the configuration setting is no more than one month. In some embodiments, the period of time between monitoring the configuration setting is no more than one week. In some embodiments, the process to monitor the configuration setting of the controller occurs every time the bicycle remains at a steady state, meaning speed and cadence are within the defined tolerance, for more than 30 seconds.

Calibration may include determining how to calibrate the bicycle. For example, calibration may involve sweeping the entire range of a ball planetary type CVT or may involve sweeping a smaller range.

Calibration may include a bicycle periodically executing a process to determine if calibration is necessary. Execution of a calibration process is performed without user intervention. A controller may use the transmission ratio to calculate an expected user pedal speed, and compare the expected user pedal speed with a user pedal speed associated with the transmission ratio sored in memory. If the calculated user pedal speed differs from the user pedal speed stored in memory by a selected threshold, a calibration process may be initiated. Referring to FIG. 1, in step 155, information about a calibration process may be communicated from a bicycle owned or rented by end user 115 to user profile server 135 or configuration server 130. Configuration server 130 may aggregate information from a set of end users having the same bicycle, CVT, or other component and provide feedback 122 to OEM 105 for incorporation into future manufacturing or configuration processes.

What we claim is:

1. A method for automatically configuring a control system on a bicycle, comprising:
   receiving, by a control system, one or more first packets of information containing a set of operating parameters for a ball-planetary continuously variable transmission (CVT), the set of operating parameters for the CVT being based on component data associated with components on the bicycle;
   receiving, by the control system, one or more second packets of information comprising a set of operating parameters for a rider preference; and
   operating the CVT and/or an electric motor cooperating with the CVT according to configuration parameters based on the one or more first packets of information and the one or more second packets of information, the configuration parameters defining how the CVT and/or electric motor responds to input parameters from bicycle sensors on the bicycle during a ride.

2. The method of claim 1, wherein the one or more first packets of information is received from a server, a vendor computer or a third-party computing device.

3. The method of claim 1, wherein the one or more second packets of information is received from a server, a vendor computer or a third-party computing device.

4. The method of claim 1, wherein the set of operating parameters for the rider preference includes information about a geographic area or jurisdiction, and wherein operating the CVT according to the configuration parameters is performed based on the geographic area or jurisdiction.

* * * * *

UNITED STATES PATENT AND TRADEMARK OFFICE
CERTIFICATE OF CORRECTION

| | |
|---|---|
| PATENT NO. | : 11,667,351 B2 |
| APPLICATION NO. | : 17/129564 |
| DATED | : June 6, 2023 |
| INVENTOR(S) | : Wayne Leroy Contello et al. |

It is certified that error appears in the above-identified patent and that said Letters Patent is hereby corrected as shown below:

On the Title Page

Item (54) and in the Specification Column 1, Lines 1-7:
SYSTEMS AND METHODS FOR AUTOMATIC CONFIGURATION AND AUTOMATIC CALIBRATION OF CONTINUOUSLY VARIABLE TRANSMISSIONS AND BICYCLES HAVING CONTINUOUSLY VARIABLE TRANSMISSION
Should read as follows:
-- SYSTEMS AND METHODS FOR AUTOMATIC CONFIGURATION AND AUTOMATIC CALIBRATION OF CONTINUOUSLY VARIABLE TRANSMISSIONS AND BICYCLES HAVING CONTINUOUSLY VARIABLE TRANSMISSIONS --

Signed and Sealed this
Eighteenth Day of July, 2023

*Katherine Kelly Vidal*

Katherine Kelly Vidal
*Director of the United States Patent and Trademark Office*